US009075858B2

(12) United States Patent
Andre et al.

(10) Patent No.: US 9,075,858 B2
(45) Date of Patent: Jul. 7, 2015

(54) NON-DISRUPTIVE DATA MOVEMENT AND NODE REBALANCING IN EXTREME OLTP ENVIRONMENTS

(75) Inventors: Mihnea Andre, Issy les Moulineaux (FR); Xun Cheng, Dublin, CA (US); Yanhong Wang, San Ramon, CA (US); Elton Philip Wildermuth, Oakland, CA (US); Heping Shang, Walnut Creek, CA (US); Stephen C. Shepherd, Lakewood, CO (US)

(73) Assignee: SYBASE, INC., Dublin, CA (US)

( * ) Notice: Subject to any disclaimer, the term of this patent is extended or adjusted under 35 U.S.C. 154(b) by 0 days.

(21) Appl. No.: 12/970,219

(22) Filed: Dec. 16, 2010

(65) Prior Publication Data

US 2012/0158805 A1 Jun. 21, 2012

(51) Int. Cl.
*G06F 17/30* (2006.01)
(52) U.S. Cl.
CPC ...... *G06F 17/30584* (2013.01); *G06F 17/3048* (2013.01)
(58) Field of Classification Search
USPC ........... 707/10, 101, 718, 822, 794, 695, 792, 707/764
See application file for complete search history.

(56) References Cited

U.S. PATENT DOCUMENTS

| 5,737,738 | A * | 4/1998 | Sharman | 1/1 |
|---|---|---|---|---|
| 6,167,490 | A * | 12/2000 | Levy et al. | 711/148 |
| 6,167,567 | A * | 12/2000 | Chiles et al. | 717/173 |
| 6,199,141 | B1 * | 3/2001 | Weinreb et al. | 711/118 |
| 6,557,011 | B1 * | 4/2003 | Sevitsky et al. | 1/1 |
| 7,610,286 | B1 * | 10/2009 | Yu et al. | 1/1 |
| 7,831,501 | B2 * | 11/2010 | Schlifstein et al. | 705/37 |
| 7,984,043 | B1 * | 7/2011 | Waas | 707/718 |
| 8,219,848 | B2 * | 7/2012 | Branson et al. | 714/3 |
| 8,266,111 | B2 * | 9/2012 | Lin et al. | 707/674 |
| 8,401,994 | B2 * | 3/2013 | Hoang et al. | 707/609 |
| 8,688,634 | B2 * | 4/2014 | Beyer et al. | 707/616 |
| 2002/0078310 | A1 * | 6/2002 | Frank et al. | 711/148 |
| 2003/0158842 | A1 * | 8/2003 | Levy et al. | 707/3 |
| 2005/0033656 | A1 * | 2/2005 | Wang et al. | 705/26 |
| 2005/0251500 | A1 * | 11/2005 | Vahalia et al. | 707/1 |
| 2006/0101081 | A1 * | 5/2006 | Lin et al. | 707/200 |
| 2007/0198554 | A1 * | 8/2007 | Liu | 707/101 |
| 2008/0222159 | A1 * | 9/2008 | Aranha et al. | 707/10 |
| 2009/0083314 | A1 * | 3/2009 | Maim | 707/103 R |
| 2009/0282100 | A1 * | 11/2009 | Kim et al. | 709/203 |
| 2010/0191783 | A1 * | 7/2010 | Mason et al. | 707/822 |
| 2010/0306222 | A1 * | 12/2010 | Freedman et al. | 707/759 |

* cited by examiner

*Primary Examiner* — Mariela Reyes
*Assistant Examiner* — Thong Vu
(74) *Attorney, Agent, or Firm* — Sterne Kessler Goldstein & Fox P.L.L.C.

(57) ABSTRACT

Systems and methods for non-disruptive cache startup, shutdown, data partition movement, and node rebalancing for a data fabric within a data grid in a database environment. The data grid is a clustered in-memory database (IMDB) cache comprising one or more data fabrics including multiple IMDB cache nodes. The method takes a time tag and moves data from source to destination nodes while allowing updates to data on the source nodes. The method propagates updates occurring after the time tag to destination nodes from source nodes and switches applications and ownership to the destination nodes. Another method slices data for a partitioned fabric and stores slices on nodes. Another method starts a data fabric by moving data from a grid backend to the nodes. In an embodiment, another method rebalances nodes in a non-disruptive manner. When a fabric is shutdown, the method saves data from the nodes to the grid backend.

22 Claims, 18 Drawing Sheets

500

| Node Partition | N1 | N2 | N3 | N4 | N5 | N6 |
|---|---|---|---|---|---|---|
| P1 | RW | RO/ZXL | RO | | | |
| P2 | RO | RW | RO/ZXL | | | |
| P3 | RO/ZXL | RO | RW | | | |
| P4 | RW | RO/ZXL | RO | | | |
| P5 | RO | RW | RO/ZXL | | | |
| P6 | RO/ZXL | RO | RW | | | |
| P7 | | | | RW | RO/ZXL | RO |
| P8 | | | | RO | RW | RO/ZXL |
| P9 | | | | RO/ZXL | RO | RW |
| P10 | | | | RW | RO/ZXL | RO |
| P11 | | | | RO | RW | RO/ZXL |
| P12 | | | | RO/ZXL | RO | RW |

502 — N1–N3 columns (P1–P7 partitions bracket on left)
504 — N3–N5 columns bracket on top

FIG. 5

NON-DISRUPTIVE DATA MOVEMENT AND NODE REBALANCING IN EXTREME OLTP ENVIRONMENTS

BACKGROUND

1. Field

The present invention relates generally to databases, particularly to improving performance and scalability of in memory databases with a distributed cache-based database system.

2. Background

The traditional outlook towards managing transactional business data is based on a persistent transaction data processing model: a debit from one account and a credit to another account, once acknowledged to an end user, must necessarily be reflected in the underlying accounts, even if the underlying computing system suffers an immediate outage at the point of transaction completion. When the system restarts, the debit account as well as the credit account must correctly reflect their state as they existed at the precise moment the transaction was successfully acknowledged to the end user. That is, these data changes need to be durable.

Transaction processing data management systems are built around providing such guarantees. These online transaction processing (OLTP) systems are designed around ACID properties: Atomic, Consistent, Isolated and Durable. ACID properties ensure that business transactions are fully reliable and accurately reflected in the underlying system, even when hundreds of transactions are processed simultaneously in extreme OLTP environments and under unpredictable system shutdown, startup, and failure scenarios.

High-performance enterprise applications often operate in extreme OLTP environments and encounter performance bottlenecks and scalability problems when trying to access data stored in a database. Traditionally, databases have used disk-based storage devices to store data. However, disk access can be very slow. To improve database performance, main memory has been used as a data buffer or cache for data stored on disk. To further improve performance and resolve scalability issues, particularly for large enterprise applications, traditional databases have employed distributed caching systems, which combine the scalability of distributed systems with the reduced access latency of main memory.

However, existing distributed caching systems pose significant challenges for database application developers and database administrators. For example, database administrators must determine how best to design and organize a distributed caching system in order to avoid database efficiency and application performance problems associated with large amounts of data movement required during cache startup. This involves a detailed understanding of not only which data should be cached, but also how and when such data is accessed. As information related to an enterprise database environment is often unavailable or difficult to acquire, it may be extremely difficult for database administrators to know which cache data needs to be populated during a cache startup or which data needs to be saved during a cache shutdown. It is also difficult to move and rebalance large amounts of data among nodes in a distributed caching system without disrupting the performance of the enterprise database environment.

Accordingly, what is needed are systems, methods, and computer program products which provide non-disruptive startup, node rebalancing, and shutdown in a distributed caching system. What is further desired are systems, methods, and computer program products to allow database administrators to move large amounts of partitioned data within a distributed caching system without disrupting the performance of applications in an enterprise database environment.

BRIEF SUMMARY

Capabilities to move and rebalance data between servers within a data grid in a database environment are provided. The data grid is a distributed in-memory database (IMDB) cache with one or more data fabrics, each data fabric comprising a plurality of IMDB cache nodes. Such capabilities may be used by database administrators to move data and perform data fabric startup and shutdown operations with minimal disruption to active database environments, including environments with a heavy online transaction processing, (OLTP) workload. Embodiments of the invention can be used in extreme OLTP environments having several data fabrics, each of them a distributed relational cache containing multiple IMDB-based nodes, and persisting data in a disk resident database (DRDB) at a backend server. In one embodiment of the invention, the backend server is a relational database management system (RDBMS) such as, but not limited to, SYBASE™ ADAPTIVE SERVER™ Enterprise (ASE, available from Sybase, Inc. of Dublin, Calif.). One of ordinary skill in the art may appreciate that embodiments of the disclosed back end server can be implemented with any RDBMS.

Embodiments of the invention include systems, methods, and computer program products for moving data between data grid servers with minimal disruption to an active, heavy OLTP workload. Embodiments of the invention also include systems, methods, and computer program products for starting up a data fabric by moving data partitions from a backend server into nodes of a data grid. In general, data storage and ownership are distributed across nodes, but each data item is owned by a single node. Data can be moved both between the grid backend and cache nodes (for data fabric startup, checkpoint, or shutdown) and between nodes (for cache rebalancing). While data is being moved, it may be updated through OLTP statements on a node owning the data (i.e., the owner node). According to an embodiment, data changes are suspended for a very short window, at the very end of a data movement process, as ownership is switched to a new owner node—then data movement resumes seamlessly and transparently to an application using the data. In this manner, the invention achieves non-disruptive movement of data in a data partition.

Embodiments relate to providing improved, non-disruptive cache startup, shutdown and data partition movement within a data grid in a database environment wherein each data fabric comprises a plurality of cache nodes and each cache node is an in-memory database server. Data between the cache nodes is moved as part of node rebalancing while simultaneously allowing data updates to continue with minimal disruption.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustra-

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIG. 5 is a table illustrating an example of distributing ownership rights for multiple nodes based on round-robin slice teams per node set, according to an embodiment.

Figure 1:
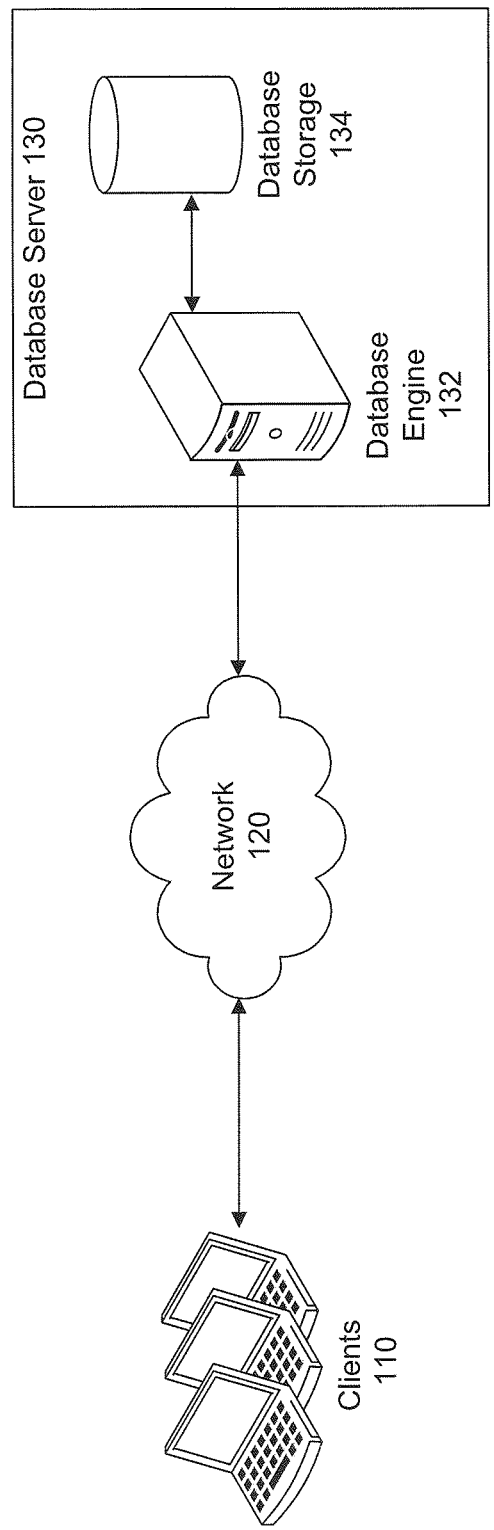
FIG. 1 is a diagram of an exemplary database system in which non-disruptive data movement and node rebalancing may be implemented.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Table of Contents

I. Database System
II. Data Grid
III. Data Fabrics in Extreme OLTP Environments
IV. Methods
   A. Non-Disruptive Partition Movement
     1. Data movement from source to destination nodes
     2. Update catch-up for changes to source during movement
     3: Switch applications and ownership to destination nodes
   B. Non-disruptive Cache Startup
   C. Non-disruptive Cache Shutdown
   D. Node Rebalancing
V. Example Computer System Implementation
VI. Conclusion Embodiments relate to producing an improved or even an optimal layout of one or more data fabrics within a data grid in a database environment. As will be described in further detail below, the data grid is an ideal way to improve performance when processing critical transactions between a database server and one or more client applications.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "in-memory database," or "IMDB," is used herein to refer broadly and inclusively to any database management system that primarily relies on main memory, rather than a disk-based mechanism, to store and manage data. In addition, such IMDBs typically reside entirely within main memory. A person skilled in the relevant art given this description would appreciate that IMDBs are generally faster than databases that rely on disks for storage.

I. DATABASE SYSTEM

Databases commonly organize data in the form of tables, each table having a number of rows and columns. Each table generally has a number of rows and columns, and each row in a table generally has a data value associated with each of the columns. This intersection of rows and columns is commonly referred to as a cell. A system needing access to data in the database typically issues a request in the form of a query. A query usually involves a request for the data contained in one or more cells of any rows that meet a particular condition. This condition often involves the comparison of the values of cells in a column to some other value to determine whether the row associated with the compared cell meets the condition.

FIG. 1 is a diagram of an exemplary database system 100 in which embodiments may be implemented. Database system 100 includes one or more clients 110, a network 120, and a database server 130. The database server 130 includes a database engine 132 and database storage 134.

Clients 110 are operable to send requests for data, commonly in the form of database queries, to database server 130 over network 120. Database server 130 replies to each request by sending a set of results, commonly in the form of result rows from a database table, to clients 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Clients 110 can each be any type of computing device having one or more processors and a communications infrastructure capable of receiving and transmitting data over a network. An embodiment of clients 110 may also include a user input such as, for example, a mouse, QWERTY keyboard, touch-screen, microphone, or a T9 keyboard. For example, clients 110 can include, but is not limited to, a mobile phone, a personal digital assistant (PDA), a computer, a cluster of computers, a set-top box, or other similar type of device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment, including but not limited to, a cluster of servers.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of database system 100 depending upon a particular application or environment.

When a request for data, such as a query, is received by database server 130, it is handled by database engine 132, in accordance with an embodiment of the present invention. Database engine 132 is operable to determine the data requested by the query, obtain the data, and provide a reply to the query. One skilled in the relevant art given this description will appreciate that while database engine 132 is illustrated as a single module in database system 100, database engine 132 may be implemented in a number of ways in order to accomplish the same function, including separating each of the aforementioned operations performed by database engine 132 into individual modules. Accordingly, the illustration of modules in database server 130 is not a limitation on the implementation of database server 130.

Database engine 132 is operable to obtain the data in response to the query from database storage 134, in accordance with an embodiment of the present invention. Database storage 134 can store files or records of a database in a data structure. In accordance with an embodiment of the present invention, database records can be stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 132 and clients 110 to interpret data contained in a data cell corresponding to the column. In accordance with an embodiment of the present invention, the database comprises multiple tables.

Additionally, database storage 134 comprises alternate means of indexing data stored in a table of a database, in accordance with an embodiment of the present invention. Database engine 132 is operable to analyze a query to determine whether an available alternate means is useful to better access the data stored in a table, and then utilize this alternate means to obtain data from the table, in accordance with an embodiment of the present invention.

Further, database storage 134 may be implemented as a relational database and database engine 132 may be implemented using a Relational Database Management System (RDBMS), in accordance with an embodiment of the present invention. An example of such an RDBMS is, for example and without limitation, ASE, available from Sybase, Inc. of Dublin, Calif. One of ordinary skill in the art may appreciate that embodiments of the disclosed subject matter can be practiced with any RDBMS.

In an embodiment, the processing of query transactions via cache nodes occurs by the RDBMS functionality (e.g., ASE) of the each cache node. In memory databases (IMDBs) provide the database cache structure of each cache node implemented using one or more memory devices. An example of a suitable basis for providing an IMDB in an ASE embodiment is described in co-pending U.S. patent application Ser. No. 12/726,063, entitled "Managing Data Storage as an In-Memory Database in a Database Management System", assigned to the assignee of the present invention and incorporated herein by reference in its entirety.

II. DATA GRID

Figure 2A:
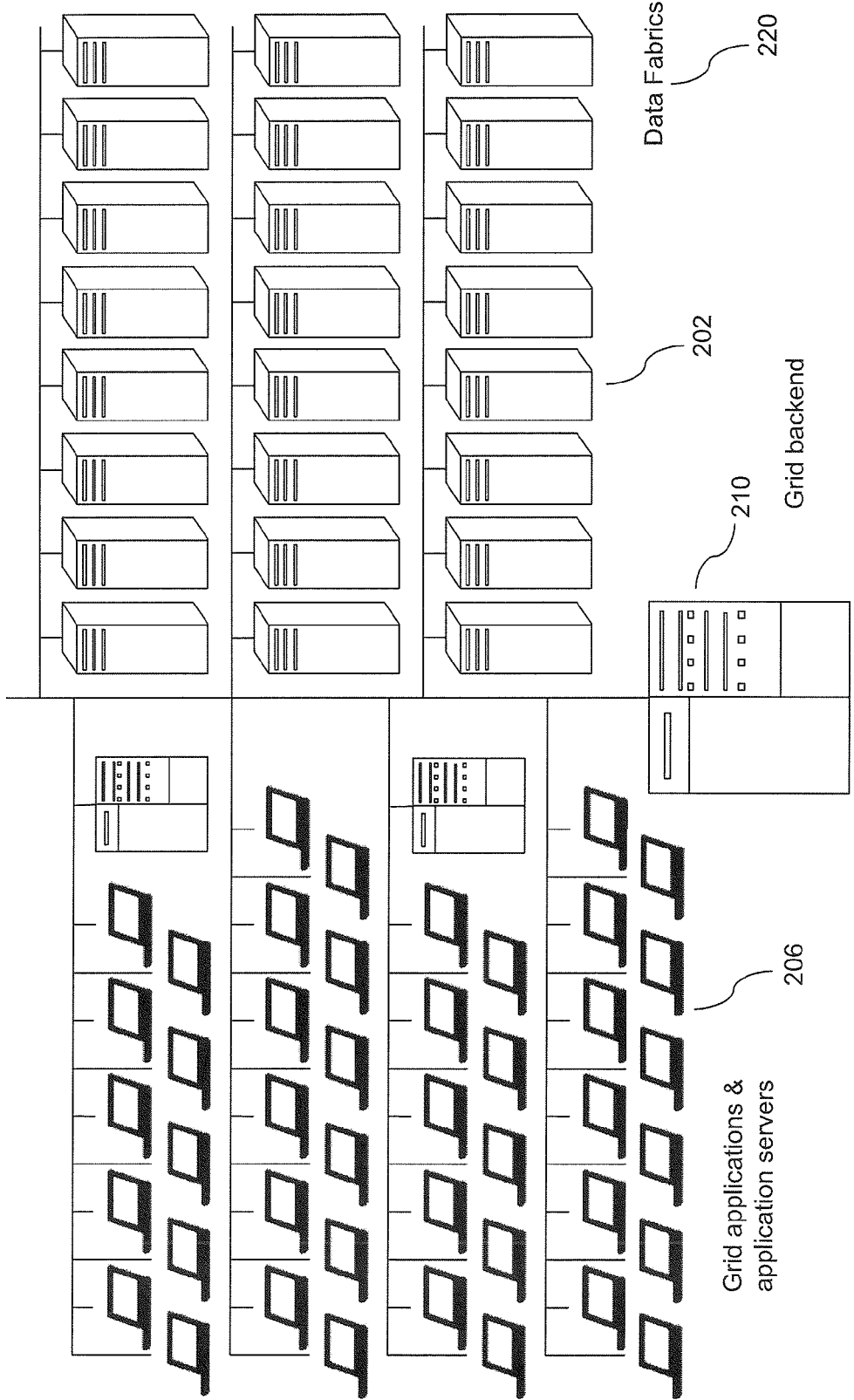
FIG. 2A is an architecture diagram of an exemplary data grid in a database environment, in accordance with an embodiment of the present invention.

FIG. 2A is a high-level architecture diagram of an exemplary data grid 200 in a database environment, according to an embodiment of the present invention. An example of a suitable architecture for providing a data grid is described in co-pending U.S. patent application Ser. No. To Be Determined, entitled "Distributed Data Cache Database Architecture", assigned to the assignee of the present invention and incorporated herein by reference in its entirety. Data grid 200 includes grid applications and application servers 206, a data fabric 220, and a grid backend 210, according to an embodiment. Although only data fabric 220 is shown, data grid 200 can have multiple data fabrics similar to data fabric 220, as described herein. Thus, data grid 200 may consist of one or more data fabrics 220 and of the grid applications 206, and grid backend 210. A data grid 200 is composed of one or more data fabrics 220 with each data fabric in turn being composed of one or more cache nodes 202.

For ease of explanation, data grid 200 will be described in the context of database system 100 of FIG. 1, but is not intended to be limited thereto. In an embodiment, the various components of data grid 200, including grid applications 206, data fabric 220, and grid backend 210, are communicatively coupled to each other via, for example, a communications network (e.g., network 120 of FIG. 1).

As shown in FIG. 2A, in an embodiment, data fabric 220 is a set of servers, which store together as a whole, one or more databases. Data fabric 220 includes cache nodes 202, according to an embodiment. Similarly, although a set of exemplary cache nodes 202 are shown in FIG. 2A, more or fewer cache nodes may be used as necessary. Grid backend 210 includes a backend database, according to an embodiment. In an embodiment, grid backend 210 may be one or more servers, such as database server 130. As will be appreciated by persons skilled in the relevant art(s), grid backend 210 may be a database server operating alone, or a cluster of database servers operating in a cluster or server farm.

In an embodiment, data fabric 220 is a clustered IMDB cache, which caches data in several IMDBs on multiple cache nodes 202 connected through a high-speed commodity network, such as network 120. In this way, data grid 200 enables extreme transaction performance with massive scale-out and zero-data-loss for high availability (HA) grid applications 206. In one embodiment of the invention, grid backend 210 is a disk based ASE server. At steady state data grid operations, grid backend 210 may be down. However, in embodiments, grid backend 210 is up for most data grid management operations, including data fabric startup, shutdown, and node rebalancing. In one embodiment, grid backend 210 contains the data to be initially cached in data fabric 220 at startup. In an alternative embodiment, data fabric 220 can also start without any initial backend data. Likewise, cached data on cache nodes 202 can be persisted to grid backend 210 when data fabric 220 is shutdown. A data fabric 220 that holds only transient data may be simply shut down without requiring the presence of grid backend 210. The latter may be the case in high performance computing (HPC) type applications.

One skilled in the relevant art(s) given this description would appreciate that grid backend 210 illustrated in FIG. 2A may include one or more backend databases (not shown). A person skilled in the relevant art(s) given this description would also appreciate that although not shown in FIG. 2A, data grid 200 and its subcomponents, including grid applications 206, a data fabric 220, and a grid backend 210, may include one or more additional components as may be necessary.

In an embodiment, data grid 200 comprises an architecture built around a distributed in-memory database (IMDB) cache that is clustered on multiple physical machines. Such a clustered IMDB cache provides a responsive transaction-performance model for processing query transactions to and from client applications (e.g., executed by clients 110 of FIG. 1) and a database server (e.g., database server 130 of FIG. 1). As will be described in further detail below, the clustered IMDB cache of data grid 200 allows for scale-out on multiple database servers. It should be noted that data grid 200 is not simply a mid-tier cache between client applications 210 and grid backend 210. Thus, in contrast to conventional caching systems, data grid 200 can continue to seamlessly process transactions even in the absence of grid backend 210, as described in further detail below.

In an embodiment, grid backend 210 is a server hosting a relational database and relational database management system (RDBMS). As noted above, an example of such an RDBMS is, for example and without limitation, Adaptive Server Enterprise (ASE) from Sybase, Inc. of Dublin, Calif. Grid backend 210 may be implemented using, for example, database server 130 of FIG. 1. In an embodiment, grid backend 210 hosts a backend database on one or more disk-based storage devices configured to store persistent backend data. For example, such backend data may comprise persistent database files or records commonly organized in the form of tables, as described above.

As noted above, data grid 200 may contain one or several data fabrics. In an embodiment, each data fabric (e.g., data fabric 220) within data grid 200 is a clustered memory cache comprising multiple cache nodes (e.g., cache nodes 202), which are configured to store all or portions of data in a database system. In an embodiment, the cache nodes 202 of data fabric 220 are IMDBs implemented using one or more database servers such as, for example, database server 130, described above. Such database servers can be implemented using any computing device having at least one processor and at least one memory device for executing and storing instructions. Such a memory device may be any type of recording or storage medium coupled to an integrated circuit that controls access to the recording medium. The recording medium can be, for example and without limitation, a semiconductor memory such as random-access memory (RAM), high-speed non-volatile memory, or other similar type of memory or storage device. Further, cache nodes 202 of data fabric 220 may be communicatively coupled to each other and one or more other devices within the database system via, for example, a high-speed network or communications interface.

In an embodiment, grid applications 206 may be any type of client application that connects to any of the cache nodes 202 of data fabric 220 for purposes of optimizing transaction performance and/or scale-out. For example, grid applications 206 may be one or more time-sensitive enterprise client applications that require reduced access latency and fast query response times. Grid applications 206 may be hosted, for example, on one or more computing devices, for example, clients 110 of FIG. 1. In an embodiment, grid applications 206 send transaction queries to data grid 200 over a network, for example, network 120 of FIG. 1. Grid applications 206 can be implemented in software, firmware, hardware, or a combination thereof. Further, grid applications 206 can also be implemented as computer-readable code executed on one or more computing devices capable of carrying out the functionality described herein. As noted above, examples of computing devices include, but are not limited to, clients 110 of FIG. 1.

In an embodiment, cache nodes 202 contain backend data cached or moved from grid backend 210 when the fabric is started up. As will be described in further detail below, all or a portion of the backend data stored in grid backend 210 may be copied initially to cache nodes 202 of data fabric 220 at startup. In an alternative embodiment, data fabric 220 can be started up without copying backend data from grid backend 210. For example, the data loaded into the cache nodes 202 of data fabric 220 may be from grid applications 206. Thus, grid applications 206 may connect to cache nodes 202 to store and manage data directly therein. Such application data may be coherent or consistent across cache nodes 202 without having any corresponding backend data or data local to a particular cache node within data fabric 220. A person skilled in the relevant art would appreciate that data grid 200 may employ one or more data services that facilitate transaction processing between grid applications 206 and data grid 200, including data fabric 220 and its components (cache nodes 202).

Although shown as a component of data grid 200 in FIG. 2A, it should be noted that grid backend 210 can be an optional component for data grid 200, according to an embodiment. Thus, the processing of data within data grid 200 (and data fabric 220) need not depend on the presence of grid backend 210. Accordingly, grid backend 210 can be connected and disconnected to and from data grid 200 as may be necessary for given application. For example, cache nodes 202 may be implemented using volatile memory and data fabric 220 may be configured to start without any initial backend data or store only temporary or transient data that does not need to be stored for later use. Further, if cached data stored at data fabric 220 needs to be persisted at shutdown, data fabric 220 may be configured to automatically save its contents to another persistent or non-persistent storage location. Such storage location may be, for example, a disk-based storage device or another backend database communicatively coupled to data grid 200 in the database system.

Alternatively, if data fabric 220 holds only transient data, it may be simply shut down without requiring the presence of grid backend 210. It would be apparent to a person skilled in the relevant art given this description that such transient data is commonly used in high performance computing (HPC) type applications. It would also be apparent to a person skilled in the relevant art given this description that grid applications 206 can include such HPC-type applications, but are not limited thereto.

It would be apparent to a person skilled in the relevant art given this description that the use of data grid 200, as described herein, within an enterprise database system could provide significant performance gains for processing transactions within the database system. Thus, one feature of embodiments of the present invention is to support database administrator (DBA) tasks for data grid 200 and grid applications (e.g., grid applications 206). These DBA tasks may include, but are not limited to, startup and shutdown of data fabric 220. In an embodiment, the startup of data fabric 220 comprises moving data from grid backend 210 to the nodes comprising data fabric 220.

As shown in FIG. 2A, grid applications and application servers 206 are communicatively coupled to one or more data fabrics 220. In an embodiment, grid applications and application servers 206 comprise OLTP applications and are configured to be aware of extreme scale-out requirements for such OLTP applications. Alternatively, grid applications and application servers 206 can be configured to be agnostic to scale-out requirements.

Data fabrics 220 can persist in a relational store. In an embodiment, data fabrics persist in database storage 134. However, data fabrics 220 comprise cache nodes 202 with IMDBs configured to support zero data/transaction loss (ZXL). In an embodiment, data fabric 220 is designed to support massive scale-out of grid applications 206.

Grid backend 210 persists data in a disk resident database (DRDB), such as DRDB 312 described below with reference to FIG. 3. According to an embodiment of the invention, data is copied from various cache nodes 202 of data fabric 220 to the DRDB of grid backend 210 when a shutdown of data fabric 220 is initiated. Such as shutdown may be initiated manually by a database administrator (i.e., for planned maintenance), or may result from an automated shutdown (i.e., due to a hardware failure within data grid 200). Grid backend 210 also persists data in its DRDB when pre-determined checkpoints occur (i.e., application checkpoints). For example, snapshots of grid applications 206, including application data, may be stored in grid backend 210 when a checkpoint is reached so that grid applications 206 may be more readily restarted in the event of an application failure.

Figure 2B:
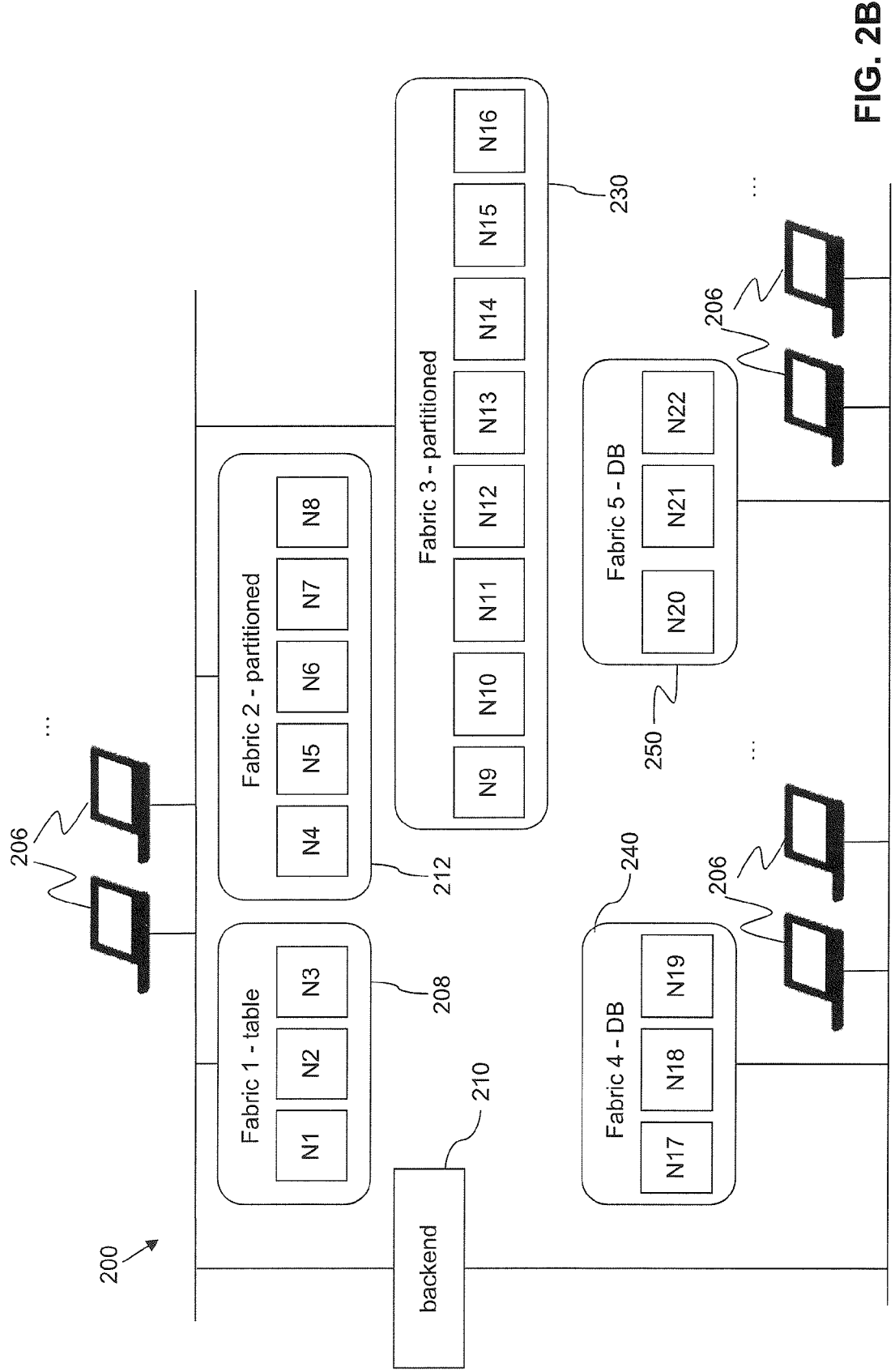
FIG. 2B depicts an example data grid with several fabrics, in accordance with an embodiment of the present invention.

FIG. 2B illustrates an embodiment of data grid 200 created with several fabrics 208, 212, 230, 240, and 250 among twenty-two nodes (N1 . . . N22). With continued reference to FIG. 2A, Nodes N1-N22 are cache nodes 202 comprising data fabrics 220.

As shown in FIG. 2B, data fabrics 220 may be either partitioned or non-partitioned. FIG. 2B depicts database, table, and partition granularity for data fabrics 208, 212, 230, 240, and 250 within data grid 200. In the example embodiment of FIG. 2B, non-partitioned fabric 208 includes a database table comprising three nodes, N1-N3. Fabrics 212 and 230 are partitioned data fabrics with data partitioned in data slices stored across nodes N4-N8 and N9-N16, respectively. As shown in FIG. 2B, fabrics 240 and 250 are databases including nodes N17-N19 and N20-N22, respectively. As depicted in FIG. 2B, grid application servers 206 and grid backend 210 are operatively connected to data fabrics 208, 212, 230, 240, and 250 within data grid 200.

The database granularity of data fabrics 240 and 250 offer the best or highest level of application compatibility for grid application servers 206. For example, with the database granularity of an IMDB, low latency with ZXL can be achieved. Granularity at the database level offers excellent scale-out for read-only grid applications 206. In an embodiment, such read-only (RO) grid applications 206 only need to execute queries (i.e., SELECT statements) against database tables and do not perform UPDATE, DELETE, or INSERT statements. The database level granularity of data fabrics 240 and 250 also support scale-out at the database level for read-write (RW) grid applications 206. The database level granularity also offers a low effort entry point to data grid 200.

According to an embodiment, the table granularity of data fabric 208 caches only backend tables needed by a grid application 206. This offers better scale-out for RW grid applications 206. For example, data fabric 208 caches the backend tables needed by a grid application 206 in nodes N1-N3. In this manner, table granularity enables massive scale-out for RW grid applications 206.

In an embodiment, the partition granularity of fabrics 212 and 230 support massive scale-out for RW grid applications 206. The partition level granularity of fabrics 212 and 230 across nodes N4-N8 and N9-N16, respectively, enables extreme throughput for an entry point to data grid 200.

III. DATA FABRICS IN EXTREME OLTP ENVIRONMENTS

Figure 3:
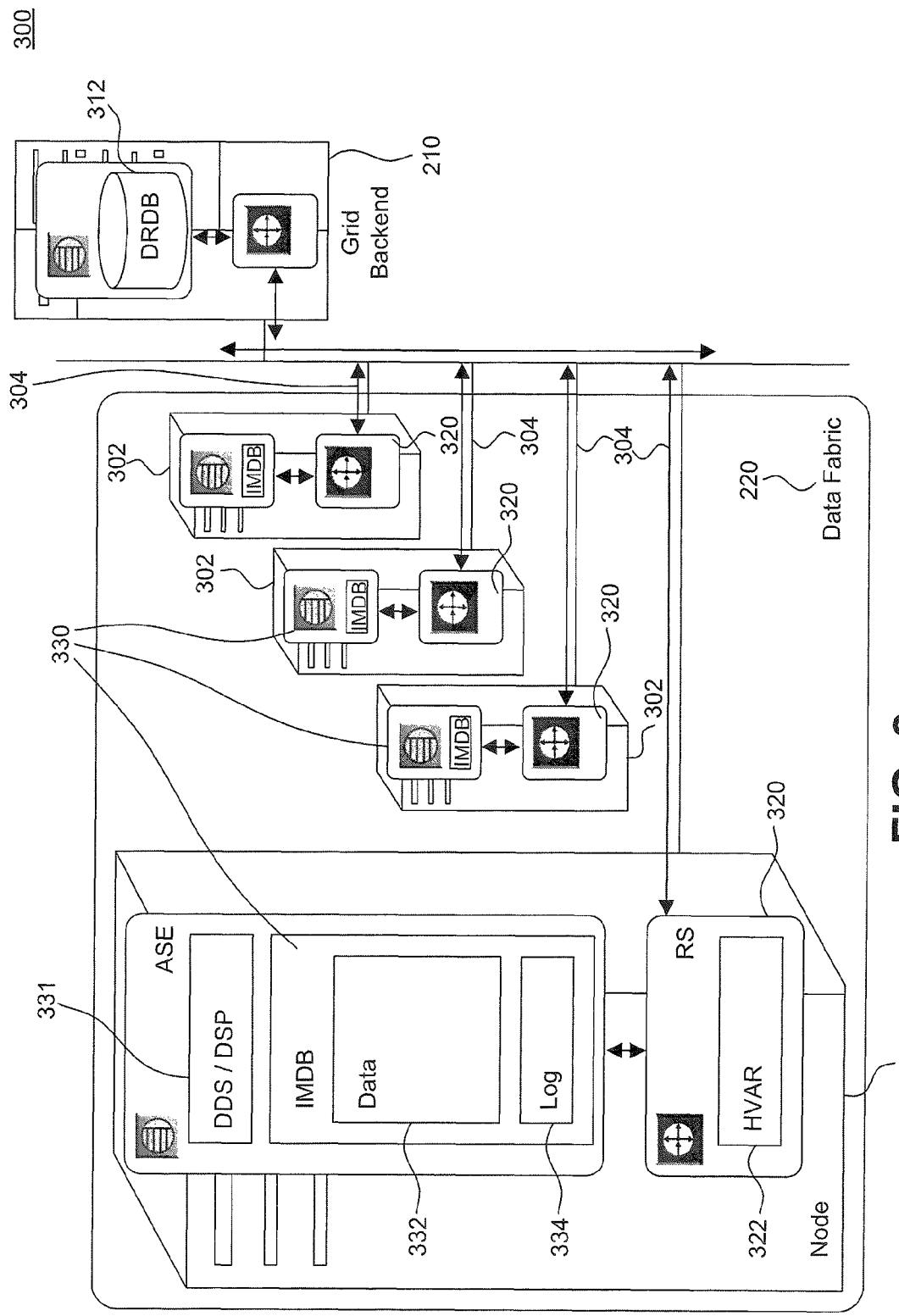
FIG. 3 illustrates a structural view of a node within a data fabric and a grid backend of the data grid of FIGS. 2A and 2B, in accordance with embodiments of the invention.

FIG. 3 is a structural view 300 of the components of a node 302 within an example data fabric 220 having four cache nodes 302. For ease of explanation, FIG. 3 is described with continued reference to database system 100 of FIG. 1 and data grid 200 of FIGS. 2A and 2B. However, FIG. 3 is not limited to those embodiments.

FIG. 3 does not show the semantics of node 302 or relationships with other nodes. Although only four cache nodes are shown, more or fewer cache nodes may be utilized. As shown, each cache node 302 of the data fabric 220 is communicatively coupled to grid backend 210 via communication links 304. In an embodiment, each node 302 can replicate data through respective replication servers 320 via communication links 304. Communication links 304 may be, but are not limited to links over network 120. Communication links 304 coupling nodes 302 to grid backend 210 may comprise a concatenation of a plurality of wired and wireless communication links.

In an embodiment, the processing of query transactions via the cache nodes 302 occurs by the RDBMS functionality (e.g., ASE) of each cache node 302. The respective IMDBs 330 provide the database cache structure of each cache node 302 implemented using one or more memory devices. An example of a suitable basis for providing an IMDB 330 in an ASE embodiment is described in co-pending U.S. patent application, Ser. No. 12/726,063, entitled "In-Memory Database Support", assigned to the assignee of the present invention and incorporated herein by reference in its entirety.

In an embodiment, cache nodes 302 contain backend data cached from grid backend 210 at fabric startup. This is accomplished by copying data from grid backend 210 when a data fabric startup is initiated. All or a portion of the backend data stored in the DRDB 312 of grid backend 210 may be copied initially to data fabric 220 at startup. In another embodiment, data fabric 220 can be started up without copying backend data from grid backend 210. For example, data fabric 220 may load the respective contents of cache nodes 302 with pre-configured template files. Such template files may contain relevant enterprise data and be stored at, for example, any storage device within the database system accessible by data fabric 220. A person skilled in the relevant art given this description would appreciate the format and contents of such a template file.

Although shown as a component of data grid 200 in FIGS. 2A and 2B, it should be noted that grid backend 210 can be an optional component for data grid 200, according to an embodiment. Thus, the processing of data within data grid 200 (and data fabric 220) may not depend on the presence of a grid backend 210. Accordingly, grid backend 210 can be connected and disconnected to and from data grid 200 as may be necessary for given application. For example, cache nodes 302 may be implemented using volatile memory, and data fabric 220 may be configured to start without any initial backend data or store only temporary or transient data that does not need to be stored for later use. Further, if cached data stored at data fabric 220 needs to be persisted at shutdown, data fabric 220 may be configured to automatically save its contents to another persistent or non-persistent storage location. Such storage location may be, for example, a disk-based storage device or another backend database communicatively coupled to data grid 200 in the database system.

Alternatively, if data fabric 220 holds only transient data, it may be simply shut down without requiring the presence of grid backend 210. It would be apparent to a person skilled in the relevant art given this description that such transient data is commonly used in high performance computing (HPC) type applications. It would also be apparent to a person skilled in the relevant art given this description that grid applications 206 can include, but are not limited to, such HPC-type applications. In an embodiment, when data fabric 220 comprises cache nodes 202 storing only transient data, the non-disruptive data fabric shutdown described herein is performed without copying such transient data from cache nodes 202 to grid backend 210. As grid backend 210 may not be present in a data grid 200 comprising a data fabric 220 holding only transient data, a startup of such data fabric 220 need not include the step of copying data from grid backend 210 to nodes 206.

In yet another embodiment, the data loaded into the cache nodes 202 of data fabric 220 may be from grid applications 206 (FIG. 2A). For example, grid applications 206 may connect to cache nodes 302 to store and manage data directly therein. Such application data may be coherent across cache nodes 302 without having any corresponding backend data or data local to a particular cache node within data fabric 220.

A person skilled in the relevant art would appreciate that data grid 200 may employ one or more data services 331 of a node that facilitate transaction processing between grid applications 206 and data grid 200, where each IMDB 330 also includes a data storage portion 328 and a log storage portion 334 to support the transaction processing by the node. In an embodiment, data services 331 include distributed statement processing (DSP) and data discovery services (DDS), where DDS refers to a set of maps, which associate a data access with the node where it may be executed. According to an embodiment, the DDS is internal to a node 302 running ASE. A DDS data service 331 maps data to the nodes 302 storing it. A DSP is a DDS-enabled distributed data processing data service 331.

The use of IMDBs 330 on nodes 302 means that data fabric 220 has no disk input/output (I/O) and very low latency. Nodes 302 persist log records from their respective log storage portions 334 over the network, in one peer IMDB. For example, log records from log storage 334 may be persisted over network 120 via communication links 304.

According to an embodiment, node 302 may also comprise a replication server 320 including high volume adaptive replication (HVAR) 322. In order to support high volume data replication, HVAR 322 trades replication granularity for throughput. Replication server 320 enables nodes 302 to have high-availability (HA) and ZXL properties. In an embodiment, HA and ZXL nodes maintain N asynchronous replicas of the same data. According to an embodiment of the invention, HA and ZXL nodes also ship log pages from log records to reconstruct the latest committed transactions in case of a failure of another node 302. In an exemplary ASE environment, RS 320 comprises Replication Server from Sybase, Inc. of Dublin, Calif., in each node 302. In an embodiment, all writes to be replicated to other nodes 302 in the clustered cache are captured in-memory and made available over network 120 via communication links 304.

Resource constraints associated with data grid 200, including data fabric 220, include, but are not limited to, one or more database schemas, hardware resource limits, and the type of database granularity. Hardware resource limits can be any type of hardware limitation associated with one or more data fabrics of data grid 200. Examples of such hardware resource limits include, but are not limited to, the total number of caches nodes within data fabric 220 and the memory size of each cache node. Such hardware resource limits may be input, for example, by a DBA or database application developer.

In an embodiment, cache nodes 302 of data fabric 220 may be associated with two different types of databases: a fabric database (Fab-DB) or a node database (Node-DB). A Fab-DB is global to data fabric 220 and data consistency is automatically maintained across cache nodes 302 in accordance with an embodiment of the invention. It is redundantly stored for high-availability (HA) and scalability on several associated read-only (RO) nodes. In contrast, a Node-DB is local to a cache node and it may or may not be present at other cache nodes 302. No data consistency is maintained across nodes 302 for a Node-DB database. In an example embodiment, all system-specific databases are Node-DBs, and all cached user databases are Fab-DBs. A person skilled in the relevant art would appreciate that these designations are provided for illustrative purposes and embodiments are not limited thereto. In a further embodiment, a Fab-DB can have any of three levels of granularity discussed above with reference to FIG. 2B: database granularity, table granularity, or partition granularity.

Figure 4:
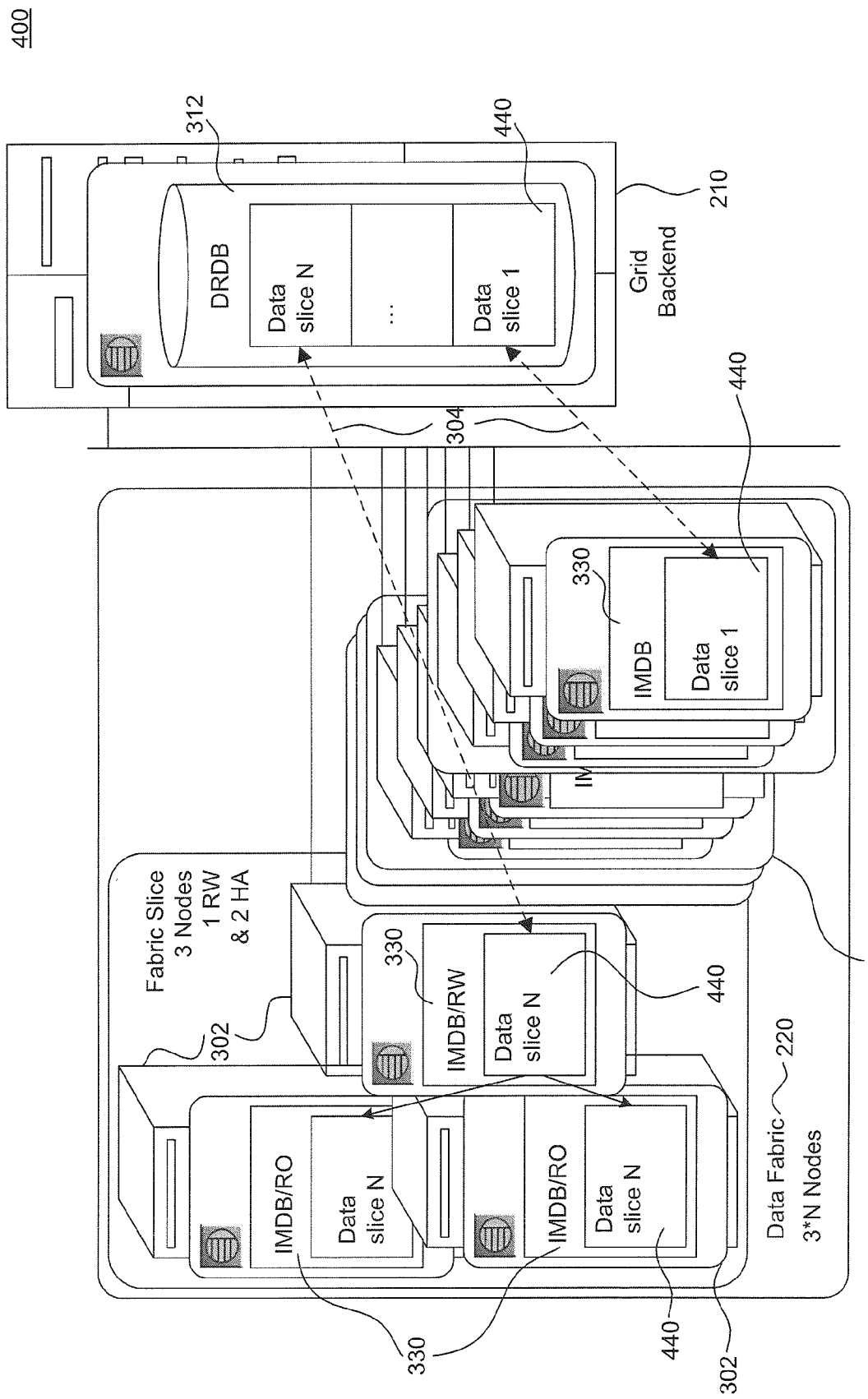
FIG. 4 illustrates a functional view of nodes within a partitioned data fabric comprising read/write and high availability/read only nodes, in accordance with an embodiment of the present invention.

FIG. 4 depicts a functional view 400 of a partitioned data fabric 220 having a fabric slice with a read/write (RW) node and HA/RO nodes. FIG. 4 is described with continued reference to the embodiments illustrated in FIGS. 1-3. However, FIG. 4 is not limited to those embodiments.

In accordance with an embodiment of the present invention, IMDBs 330 of the RW and HA/RO nodes 302 comprise data slices 440. Data is sliced to support unlimited RW scale-out for RW nodes 302. According to an embodiment, each data slice 440 is stored on several nodes 302 in order to avoid data loss in the event of the failure of a single node 302. For example, a partitioned fabric, such as fabrics 212 and 230 described above with reference to FIG. 2B, there may be P data slices 440 stored on N nodes 302, where P is a factor of 10 larger than N. In exemplary embodiments, there are 10 to 100 data slices 440 for each node. Data is sliced across data slices 440 on nodes 302 in order to reduce the volume and workload per node. In an embodiment, semantic slicing minimizes cross-node processing across multiple nodes 302. One data slice 440 is stored on multiple nodes 302 to prevent data loss in the event of the failure of a single node 302. These multiple nodes also offer HA/ZXL properties and read-only scale-out. In an embodiment, read-write (RW) ownership is distributed across all N nodes for better load balancing.

In order to be able to rebalance data amongst nodes, there is a finer granularity of data partitions than nodes. To enable movement of large amounts data within data fabric 220 in a non-disruptive manner, embodiments of the invention employ many more partitions than nodes. For example, there may be 10 or 100 partitions per node 302 in order to support a non-disruptive startup of data fabric 220 wherein data is populated to nodes 302. As used herein, in an embodiment, "non-disruptive data movement" refers to large amounts of data movement occurring without stopping grid applications 206 or leaving grid applications and application servers 206 with merely read-only access to data. Non-disruptive data movement is achieved via data partition movement as described in section A below. In embodiments, non-disruptive data movement involves moving multiple gigabytes (GBs) or terabytes (TBs) of data without significant delays in accessing or updating the data via grid applications 206.

For a data fabric layout based on partition granularity, multiple slices are put into slice teams and multiple cache nodes are put into node sets, according to an embodiment. Embodiments of the invention decide how to distribute the slice teams on such node sets. A person skilled in the relevant art given this description would appreciate that any number of well-known methods may be used to distribute slice teams on node sets. One example is to use a round-robin format for distributing RO and/or RW ownership of cache nodes based on multiple slice teams.

FIG. 5 is a table 500 illustrating an example of distributing ownership rights for multiple nodes based on round-robin slice teams, according to an embodiment. In the example shown in table 500, a data fabric layout with twelve slices 502 on six cache nodes 504 is used. Two slice teams and two sets of nodes are formed.

Figure 6:
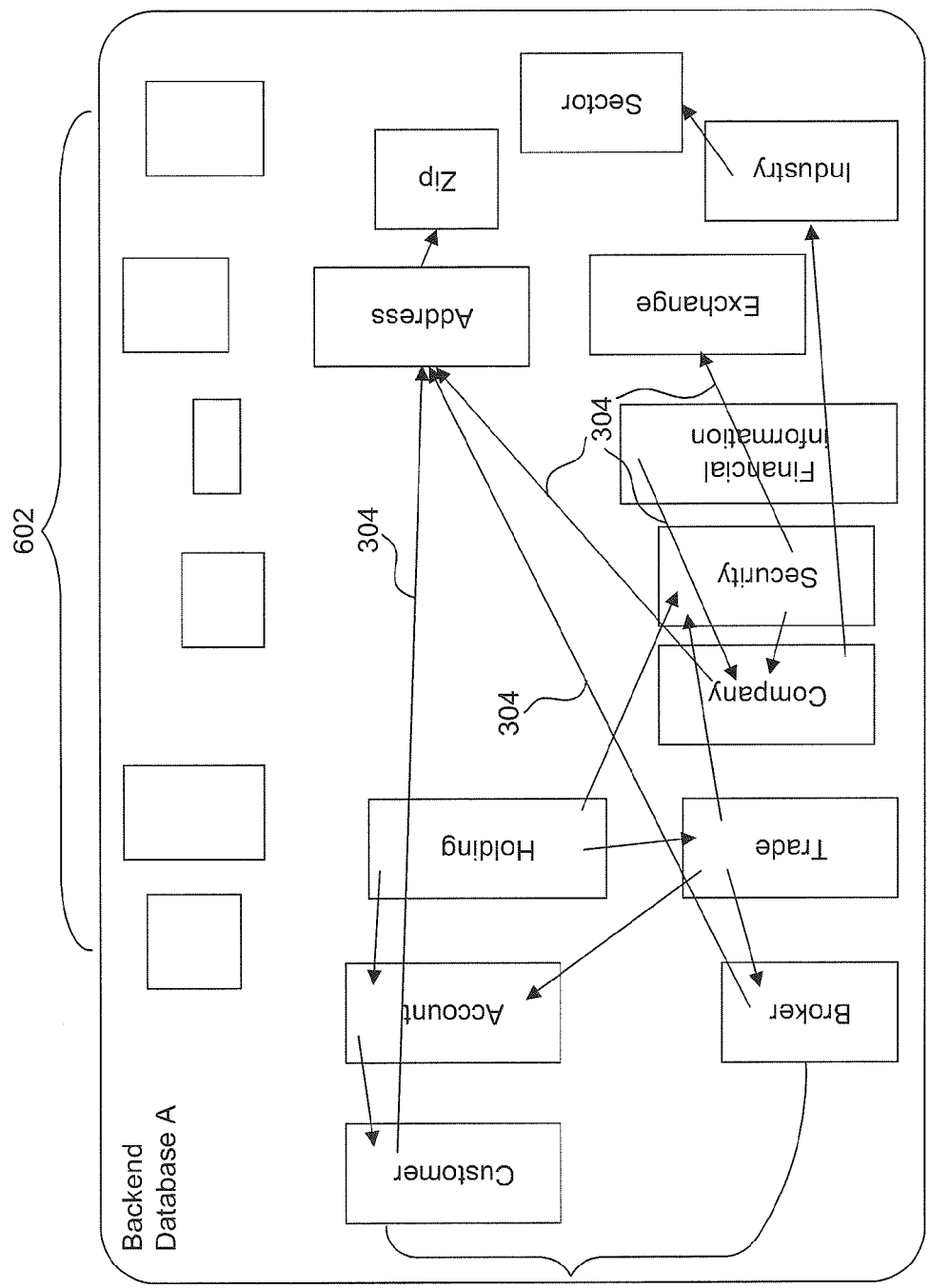
FIG. 6 depicts an exemplary grid schema including a backend database and tables, in accordance with an embodiment of the present invention.

FIG. 6 depicts a simplified grid schema 600 including a backend database and tables, in accordance with an embodiment of the present invention. Backend database A depicted in schema 600 comprises a plurality of backend tables 602. Grid schema 600 can comprise several tree schemas, wherein each tree schema persists objects such as cached tables 604 in a class hierarchy. For example, cached tables 604 can include a single root table with several child tables. It would be apparent to a person skilled in the art that child tables reference or point to another table with a foreign key (FK) back to a partition key (PK). This reference can be to the root table or another child table. In an embodiment, the tree schema cached tables 604 are equi-partitioned according to FK→PK references. These foreign and partition key references may be communicated via communication links 304. In an embodiment, the partition key must be included in each table's primary key. The equi-partitioning may be virtual partitioning and independent of the actual backend table 602 partitions.

Figure 7:
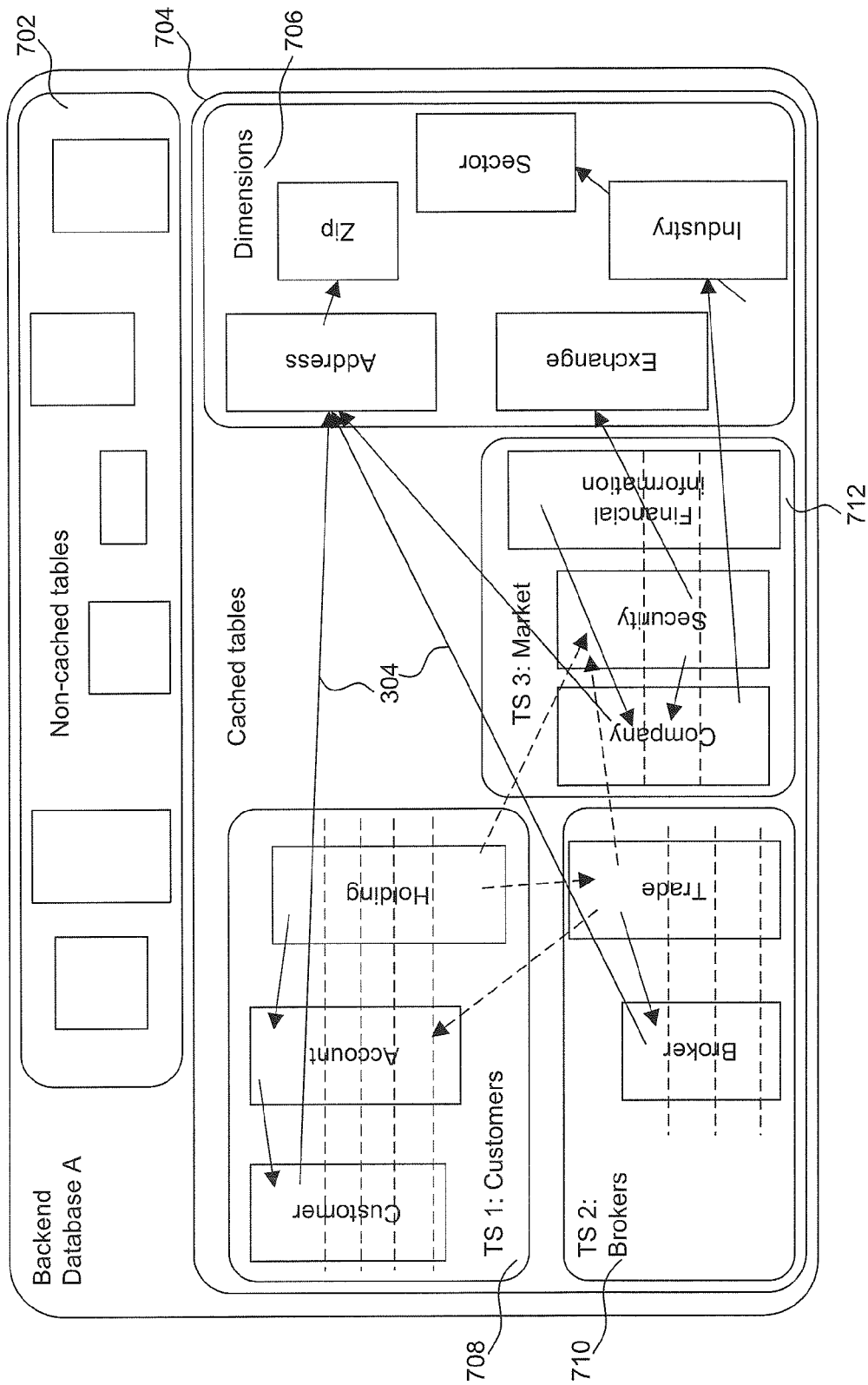
FIG. 7 illustrates an exemplary database tree schema with dimensions, in accordance with an embodiment of the present invention.

FIG. 7 illustrates an exemplary database tree schema 700 with dimensions, in accordance with an embodiment of the present invention. Cached database 704 comprises dimension tables 706, and tree schema tables 708, 710, and 712. Several dimension tables 706 contain reference data needed by the tree schemas. The tree schema tables 708, 710, and 712 reference to point to dimensions tables 706 (FK→PK). In an embodiment, the dimensions tables 706 are non-partitioned, with a full replica on each node 302.

Figure 8:
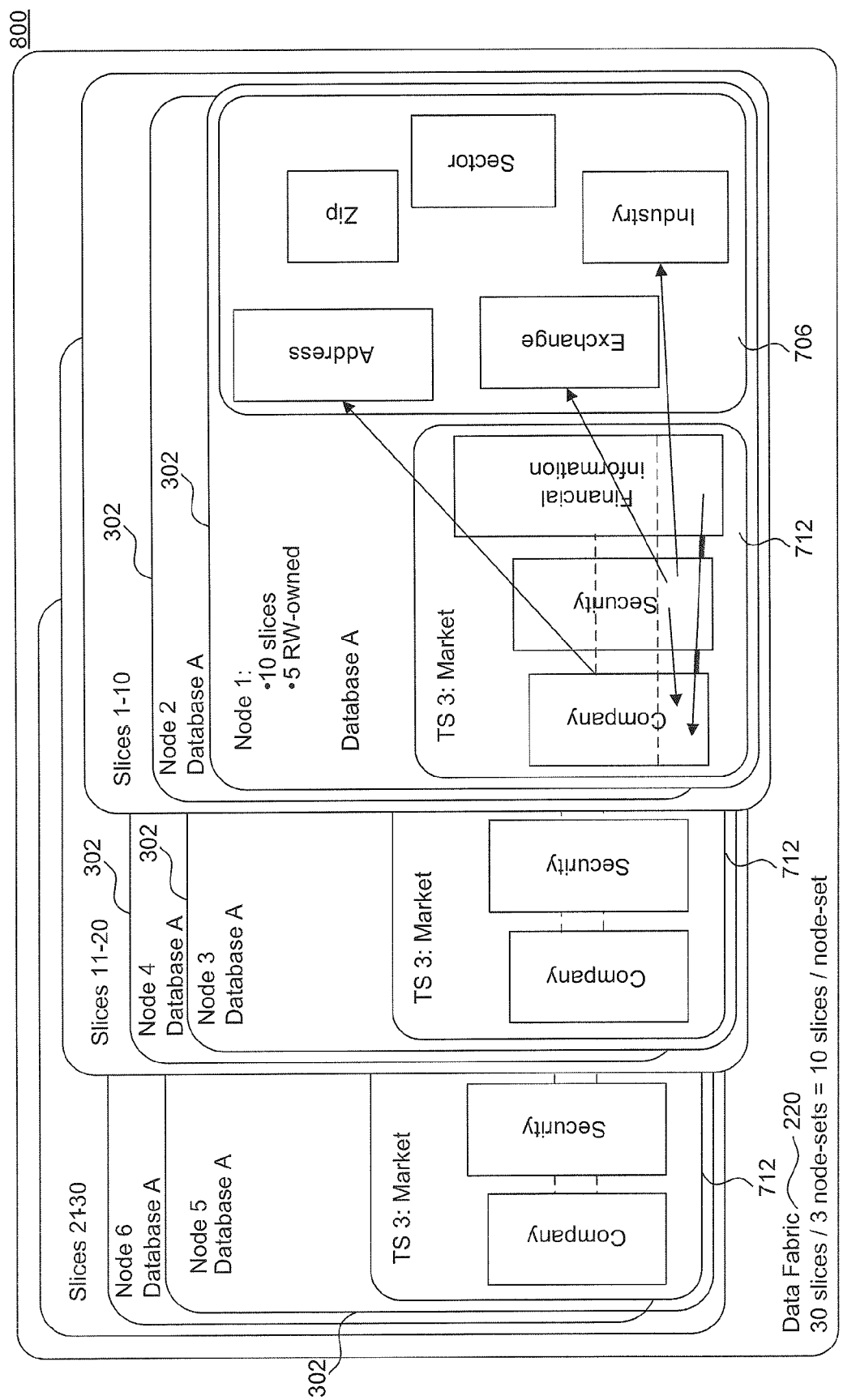
FIG. 8 illustrates a grid schema including a partitioned data fabric and a database tree schema with slices and nodes, in accordance with an embodiment of the present invention.

FIG. 8 depicts an exemplary grid schema 800 for a partitioned fabric 220 comprising tree schema slices and nodes 302. In the example embodiment of schema 800, dimensions tables 706 and tree schema tables 712 for database A are partitioned across nodes 1-6. As shown in FIG. 8, data fabric 220 is partitioned across three node sets (e.g., nodes 1 and 2, nodes 3 and 4, and nodes 5 and 6). Each of these node sets comprises groups of 10 slices (e.g., slices 1-10, 11-20, and 21-30). In an embodiment, slices 1-30 are data slices 440 discussed above with reference to FIG. 4. For node 1, slices 1-10 comprise five RW-owned slices, according to the example of schema 800.

Figure 9:
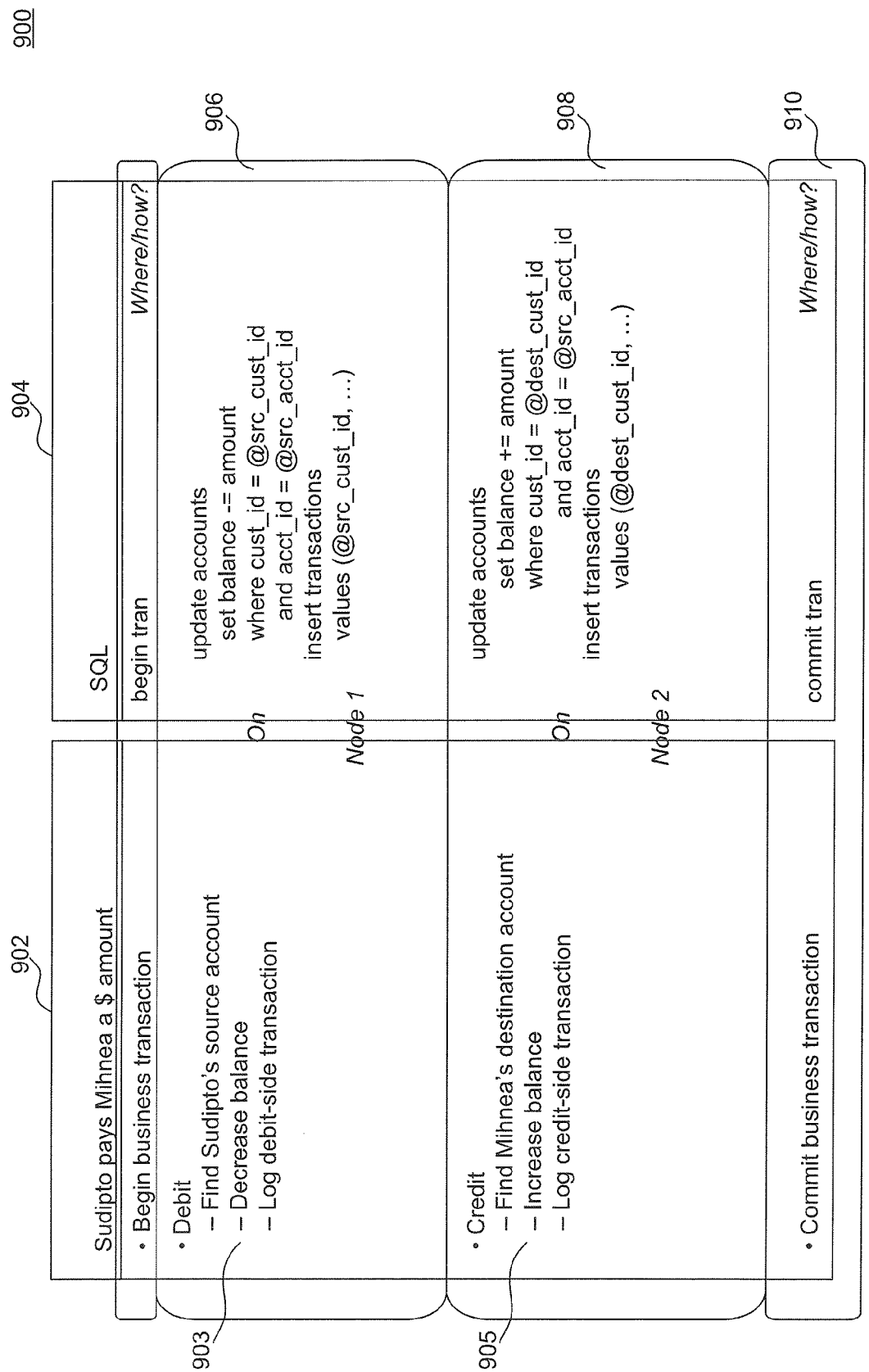
FIG. 9 depicts exemplary multi-node transactions in a grid schema, in accordance with an embodiment of the present invention.

FIG. 9 depicts exemplary multi-node transactions in a grid schema, according to an embodiment of the invention. In an embodiment, business transaction 902 comprises a debit business transaction 903 and a credit business transaction 905. FIG. 9 is described with continued reference to the embodiment illustrated in FIG. 3. However, FIG. 9 is not limited to that embodiment.

Business transaction 902 can access data on several nodes 302, even in cases where the transaction involves tables within a single tree schema. This is the case whenever business transaction 902 accesses data within more than one object. In an embodiment, a DDS data service 331 automatically forwards statements to the appropriate node (node 1 or node 2 in the example of FIG. 9). According to an embodiment, a DSP-optimized grid schema accesses a single node for a single object related to debit business transaction 903 or credit business transaction 905. In an embodiment, all point query joins for SQL queries 904 can be done locally. For example, the debit update transaction 906 corresponding to debit business transaction 903 executes locally on node 1. Similarly, credit update transaction 908 corresponding to a credit business transaction 905 is run on node 2. In the example illustrated in FIG. 9, after the UPDATE and INSERT statements are executed and a commit point is reached, the transactions are committed via a commit transaction operation 910. Commit transaction operation 910 commits the results of the corresponding business transaction. In an embodiment, after the commit transaction operation 910 is completed, log pages for log records corresponding to the latest committed transactions (i.e., the INSERTs and UPDATEs) are shipped to other nodes so that these transactions can be reconstructed in the event of a failure of either node 1 or node 2. For example, an HA node 302 may receive log records from log storage 334 corresponding to the committed transactions. In order to optimize commits, an embodiment of the invention performs a group commit in order to commit batches of transactions together.

Figure 10:
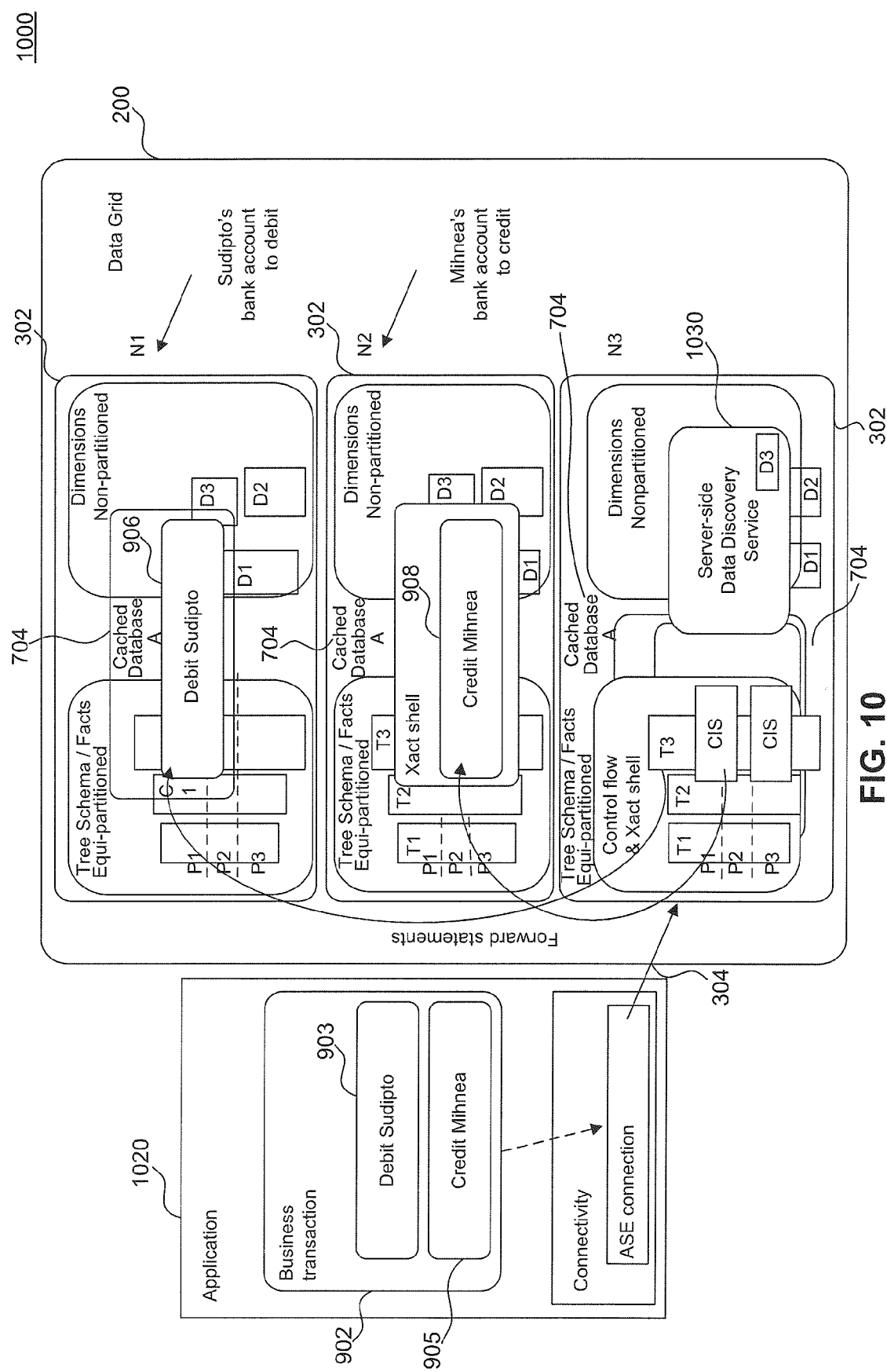
FIG. 10 is a diagram illustrating server side data discovery services, in accordance with an embodiment of the present invention.

FIG. 10 is a diagram illustrating operation of server side data discovery services (DDS), in accordance with an embodiment of the present invention. Server-side DDS 1030 is resident on a server node 302, which is one of three nodes, N1-N3 in the exemplary data grid 200 of FIG. 10. FIG. 10 is described with continued reference to the embodiments illustrated in FIGS. 3, 7, and 9. However, FIG. 10 is not limited to those embodiments.

In the embodiment shown in FIG. 10, N3 is a server node 302 comprising cached database 704. As discussed above, DDS is one of the data services 331. Server side DDS 1030 refers to a set of maps, which associate a data access with a node 302 where it may be executed. As shown in FIG. 10, based on these maps, server side DDS 1030 determines that credit update transaction 908 executes on N2. Similarly, server side DDS knows debit update transaction 906 executes on node N3.

According to an embodiment, application 1020 is a grid application 206 comprising a business transaction 902. Business transaction 902 includes debit business transaction 903 and a credit business transaction 905 as described above with reference to FIG. 9. In the example embodiment illustrated in FIG. 10, business transaction 902 has communicates with an RDBMS via connectivity (e.g., an ASE connection) within application 1020. In this way, application 1020 communicates with node N3 via communication link 304.

In an embodiment, read only (RO) queries and read write (RW) data manipulation language (DML) transactions are forwarded to a node 302 which 'owns' the tree schema slice (i.e. the tree schema slice within a cached database 704 resident on that node). According to an embodiment, RO queries are forwarded to an 'all-fabrics/slices' proxy-based RO node. Such a connection may be made via communication link 304. A non-limiting example of migrating or forwarding a connection to a node is represented by the following SQL statement. In the example below, the RW transaction for the customers table for a given customer ID (cust_id) will be forwarded to the node 302 whose cached database 704 owns the customers table. As would be appreciated by one of skill in the relevant arts, other programming languages and technologies can be used to migrate a connection to a node in the programming language code sample below.

use node
for RW to customers
where cust_id=@cust_id

A non-limiting example of forwarding a statement to another node 302 is represented by the following SQL statement. In the example below, a statement to execute a stored procedure stored_proc is forwarded to a node 302 based on a RW transaction for the customers table for a given customer ID (cust_id). As would be appreciated by one of skill in the relevant arts, other programming languages and technologies can be used to forward a statement to a node in the programming language code sample below.

on node
for RW to customers
where cust_id=@cust_id
exec stored_proc arg1, ...

Figure 11:
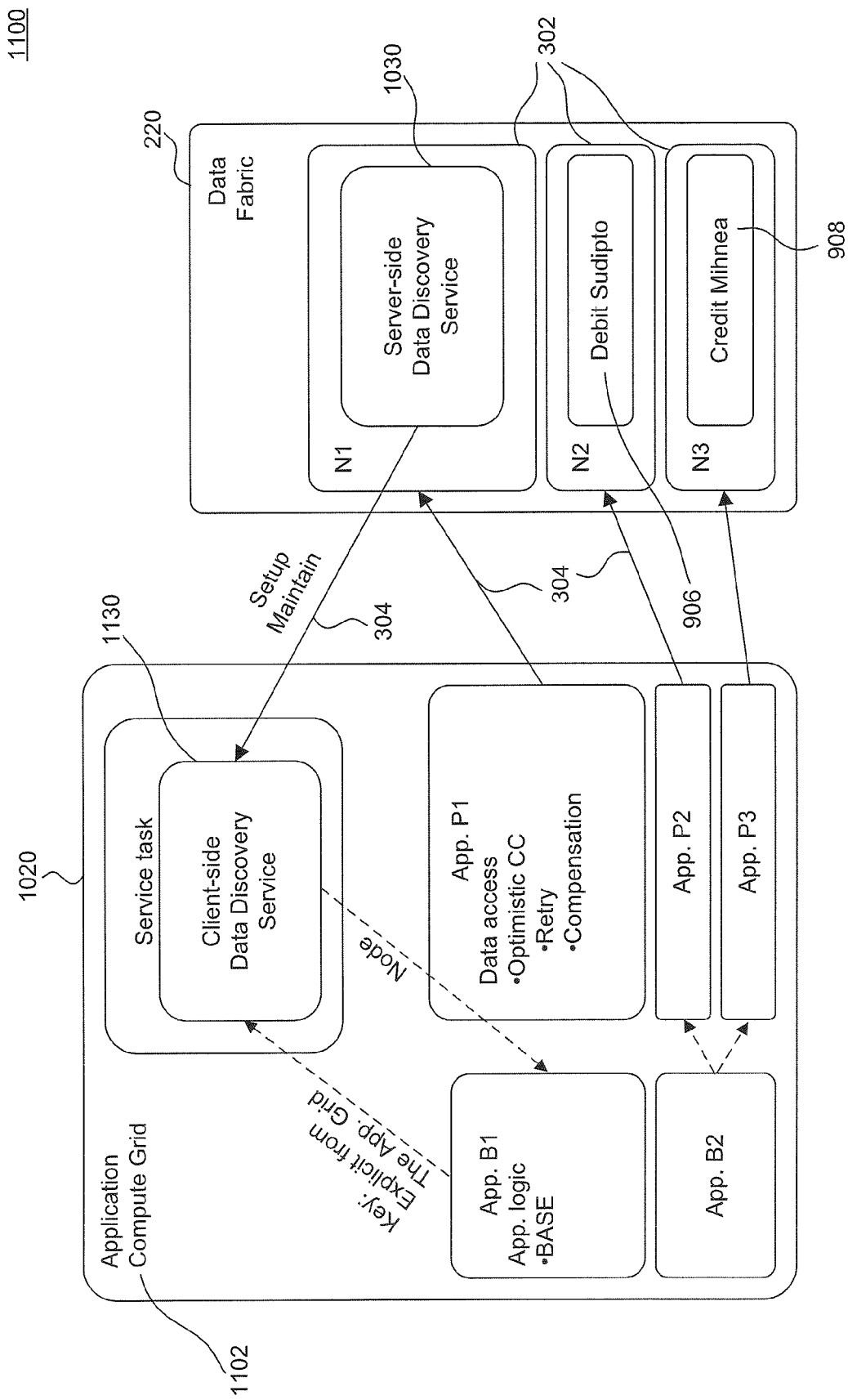
FIG. 11 is a diagram illustrating client side data discovery services, in accordance with an embodiment of the present invention.

FIG. 11 is a diagram illustrating a client-side data discovery service (DDS), in accordance with an embodiment of the present invention. FIG. 11 is described with continued reference to the embodiments illustrated in FIGS. 2, 3, 7, 9, and 10. However, FIG. 11 is not limited to those embodiments.

In the example provided in FIG. 11, client-side DDS 1130 is part of application compute grid 1102, which is associated with application 1020. Application compute grid 1102 includes one or more applications with BASE properties: Basically Available, Soft state, and Eventual consistency. BASE applications B1 and B2 and partitioned applications P1, P2, and P3 depicted in FIG. 11. BASE applications B1 and B2 provide eventual consistency by propagating data updates across nodes N1-N3 over time. Client side DDS 1130 enables BASE applications B1 and B2 within application compute grid 1102 to process sub-ACID transactions while eventually guaranteeing consistency through transaction retries nm by application P1 as needed. Server-side DDS 1030 sends setup and maintenance statements to client-side DDS 1130 via communication link 304. As shown in FIG. 11, an application within application compute grid 1102, such as P1, handles any transaction failures after the fact (posteriori) through retries and compensation transactions (i.e., transactions that compensate for any failed transactions). Applications within application compute grid 1102 communicate with nodes 302 of data fabric 220 via communication links 304. For example, applications P1, P2, and P3 communicate with each of nodes N1, N2, and N3, respectively in order to access data for debit update transaction 906 and credit update transaction 908.

Figure 12:
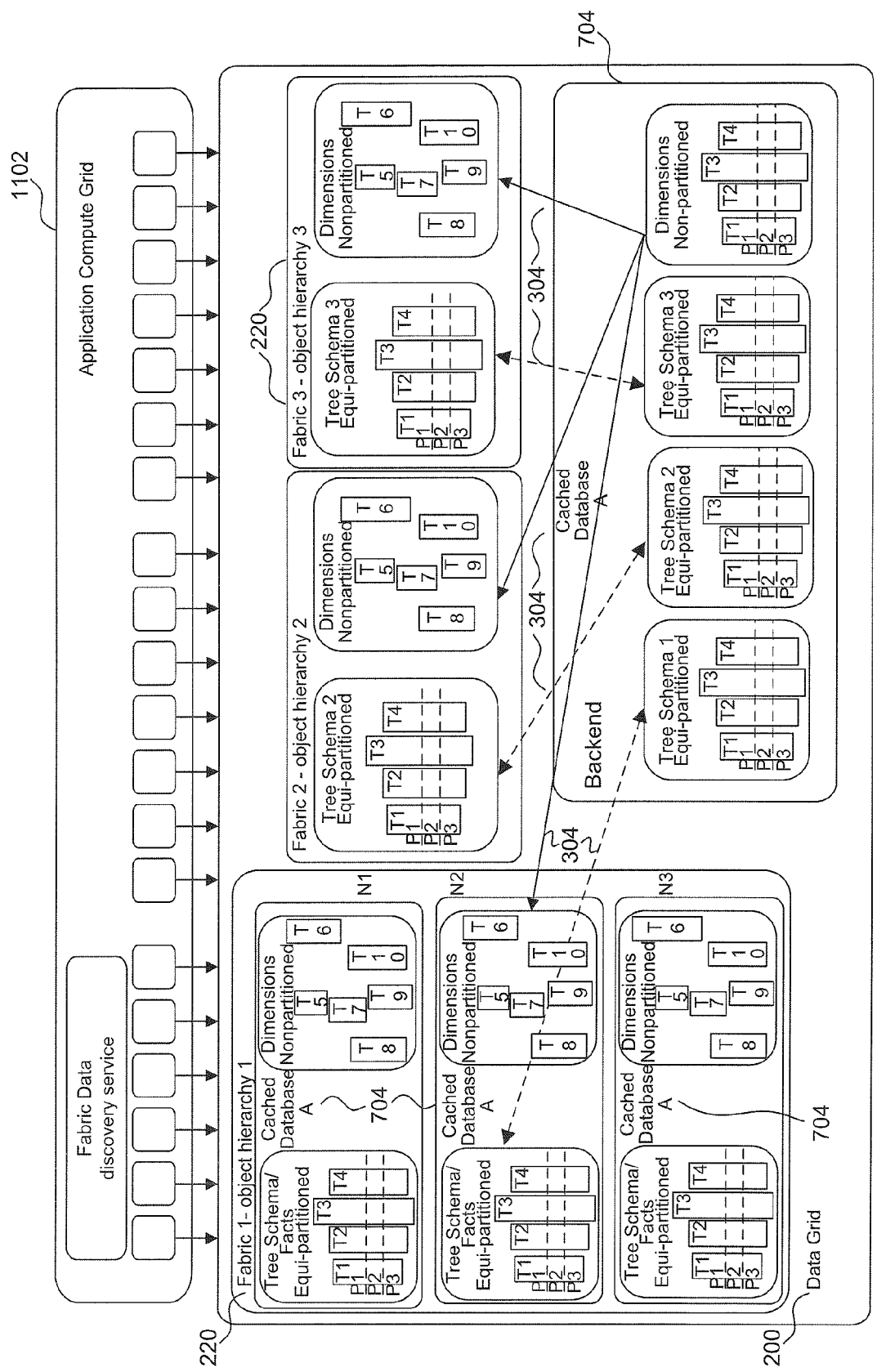
FIG. 12 is a diagram illustrating a data grid schema and data discovery services, in accordance with an embodiment of the present invention.

FIG. 12 is a diagram illustrating a data grid schema and data discovery services, in accordance with an embodiment of the present invention. FIG. 12 is described with continued reference to the embodiments illustrated in FIGS. 1, 2 and 7. However, FIG. 4 is not limited to those embodiments.

As shown in FIG. 12, a transaction executing within data grid 200 may use data on different nodes. For example, an application may access data from cached databases 704 on nodes N1-N3. As shown in FIG. 12, in an embodiment, cached databases 704 within data fabrics 220 have object hierarchies. Within each of these hierarchies are respective tree schemas with equi-partitioned tables T1-T4 and dimensioned non-partitioned tables T5-T10. According to an embodiment, while each individual transaction statement is executed on a single node, each transaction may be executed on a different node. In an embodiment, only point-queries on tree schema tables T1-T4 are allowed in DML statements and a DML statement is executed on a single node. Thus, such DML statements modify data local to that single node.

According to an embodiment, DML statements run against dimensions tables T5-T10 are executed on the grid backend in its cached database 704. This is done in a partitioned fabric of the grid backend's Read Only (RO) data. However, an RO statement may cross multiple nodes, such as N1, N2, and N3. In an embodiment, such RO statements are executed on a special all-data-proxies RO node.

According to an embodiment of the invention, DML statements crossing multiple nodes may be done through a SQL extension (e.g., an extension to Transact-SQL/T-SQL). While there is overhead associated with such multi-node transactions, through non-disruptive data movement, massive scaleout is still enabled. The overhead depends only of the complexity of the transaction and does not depend on the number of fabric slices.

In an embodiment, execution of massive amounts of DML statements is enabled through explicit execution on a set of one or more nodes. A non-limiting example of executing a statement on a set of nodes is represented by the following SQL statement. In the example below, a statement to explicitly execute a stored procedure stored_proc on all nodes. As would be appreciated by one of skill in the relevant arts, other programming languages and technologies can be used to execute a statement on a set of nodes in the programming language code sample below.

on all node
for RW to customers
exec stored_proc arg1, . . .

Explicit execution on one or more designated nodes allows for flexible logical level target node definition. This covers sets of nodes involved in actions across an entire data grid 200 or data fabric 220. In this way, a stored procedure invocation designating all cache nodes 202 of a data fabric 220 enables data grid/data fabric-wide concurrent stored procedure invocation. According to an embodiment of the invention, there is no distributed statement processing (DSP) on the target node and there is only local execution. However, there are no point query DML limitations within available local data).

In an embodiment, queries for a work-set are identified based on whether one or more runtime query-optimization techniques can be applied to such queries for further reducing processing latency. For example, such queries may be identified based on input from a developer of grid applications 206, a DBA, or based on a predetermined list of known queries. In an embodiment, queries are identified based on the type of query. For example, it may be determined that such query optimization techniques may be applied to INSERT, DELETE, UPDATE and SELECT operations as well as cursor FETCH queries. It would be apparent to a person skilled in the art that these queries are provided as examples only and that other queries may be identified as well. A person skilled in the art would also appreciate that any one of various well-known query optimization techniques may be applies to such queries.

In an embodiment, the generated work-set may be deployed and data grid layout (i.e., layout of data fabric 220) to data grid 200. Alternatively, a separate deployment tool within database system 100 may be used to deploy the work-set and/or data grid layout. Examples of such deployment tools are discussed below with reference to FIGS. 13 and 14.

Figure 13:
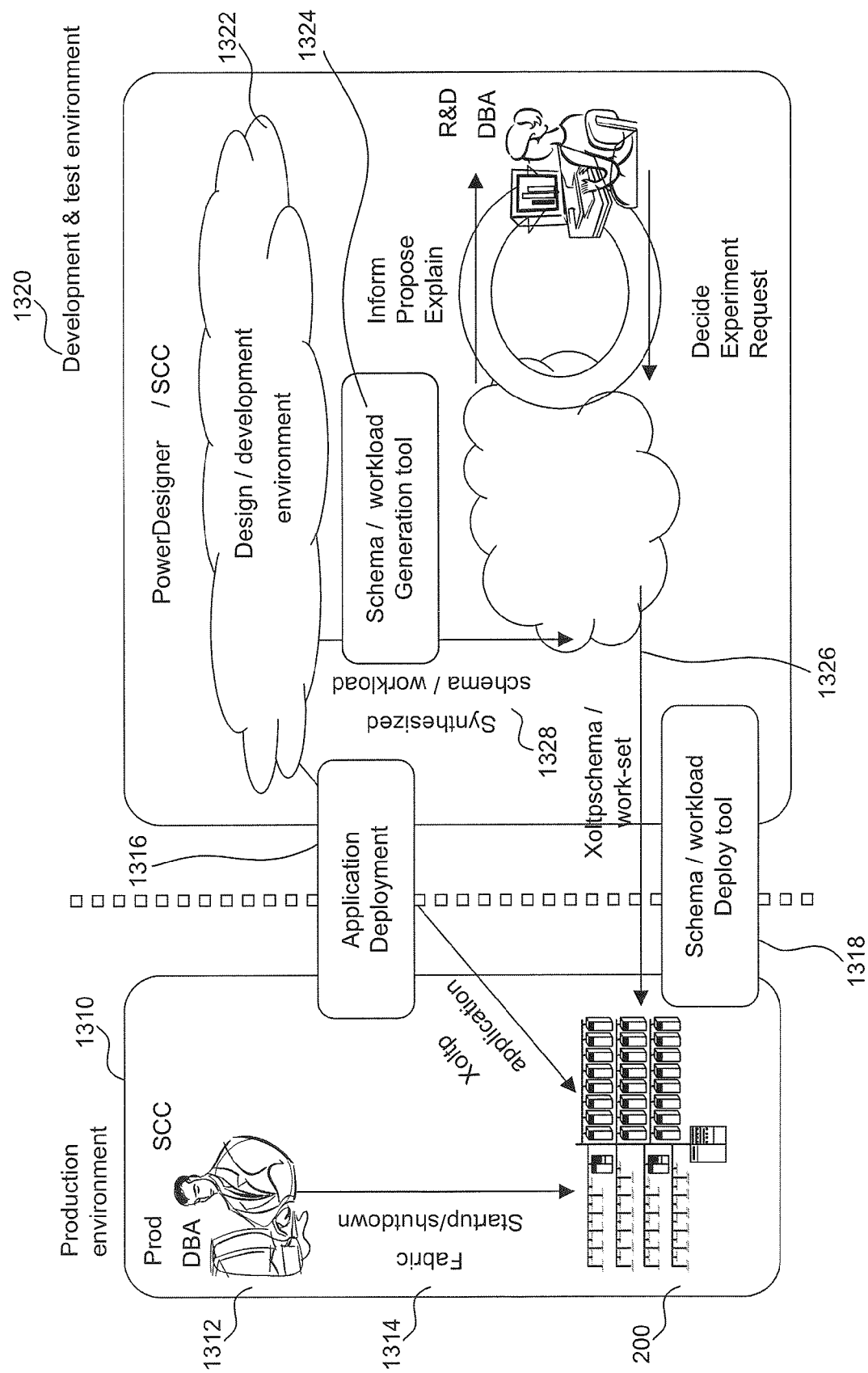
FIG. 13 illustrates cache physical design for new applications, according to an embodiment.

FIG. 13 illustrates a process for performing a cache physical design for new grid applications. FIG. 13 is described with continued reference to the embodiment illustrated in FIG. 2. However, FIG. 13 is not limited to that embodiment.

As shown in FIG. 13, application deployment tool 1316 deploys grid applications, such as grid applications 206, from a development and test environment 1320 to production environment 1310.

Application deployment can be performed in conjunction with a schema/workload deployment tool 1318. In an embodiment, schema/workload deployment tool 1318 sends an extreme OLTP schema/work-set 1326 to data grid 200 and application deployment tool 1316 sends any corresponding extreme OLTP application. Prior to application deployment, a synthesized schema/workload 1328 is sent from design/development environment 1322 via schema/workload generation tool 1324. Application deployment for new applications can alter the physical design of a cache.

As part of the deployment process for a new application, a DBA, using a data grid advisor (not shown), identifies candidate tree schemas. Examples of methods and systems for providing such a data grid advisor are described in co-pending U.S. patent application, Ser. No. To Be Determined, entitled "Data Grid Advisor", assigned to the assignee of the present invention and incorporated herein by reference. The DBA can choose tables within a schema to cache. In an embodiment, the data grid advisor proposes tables to cache and provides information to the DBA explaining the proposals. Based on the tables selected to be cached, tree schemas and dimensions are placed in data fabrics within synthesized schema/workload 1328 by schema/workload generation tool 1324. These data fabrics are then deployed to production environment 1310 as part of extreme OLTP schema/work-set 1326 by schema/workload deployment tool 1318, where they become part of data grid 200 upon a subsequent fabric shutdown and startup 1314 operation. In an embodiment, a production DBA 1312 performs a data fabric shutdown and startup 1314, wherein the shutdown process copies data from cache nodes 202 to grid backend 210 and the subsequent startup process populates data to cache nodes 202 from grid backend 210, in order to propagate the new extreme OLTP schema/work-set to the cache nodes 202 of the data fabric. The process of data fabric startup and shutdown 1314 is explained below in sections IV B and IV C with reference to FIGS. 16A and 16B, respectively.

It would be apparent to a person skilled in the art that the physical design of the cache may be altered when new applications are deployed. Schema/workload deployment tool 1318 determines the number of slices and number of nodes per slice for the cache. Schema/workload generation tool 1324 selects queries to place in the extreme OLTP schema/work-set 1326, which is in then deployed to data grid 200 in production environment 1310 by schema/workload deploy tool 1318.

Once an application is deployed by application deployment tool 1316 and the extreme OLTP schema/work-set 1326 is deployed by schema/workload deploy tool 1318.

Figure 14:
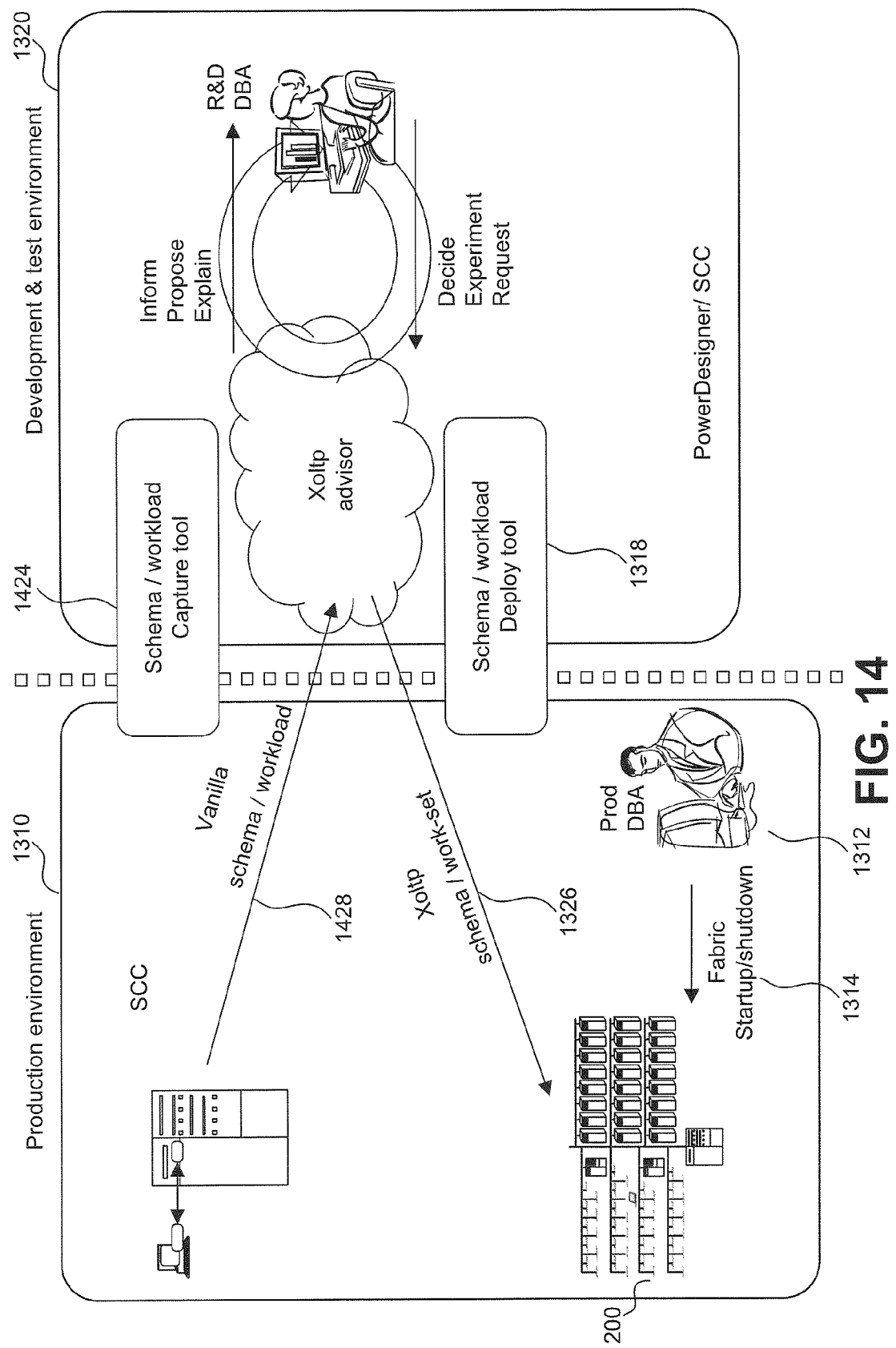
FIG. 14 illustrates cache physical design for existing applications, according to an embodiment.

FIG. 14 illustrates a process for performing cache physical design for existing grid applications. FIG. 14 is described with continued reference to the embodiments illustrated in FIGS. 2 and 13. However, FIG. 14 is not limited to those embodiments. In the case of existing grid applications 206, an application compatibility-oriented grid layout is generated based upon alterations to the applications. Schema/workload capture tool 1424 is used to capture the existing schema/workload 1428 within production environment 1310. Based upon the existing schema/workload 1428 from production environment 1310, and alterations made to existing applications in development and test environment 1320, a data grid advisor (not shown) assists a DBA with making the existing application 'grid aware' for massive scale-out.

After the existing application is modified and made to be grid-aware, it is deployed as part of extreme OLTP schema/work-set 1326 by schema/workload deploy tool 1318. As discussed above with reference to FIG. 14, the modified application becomes part of data grid 200 after a data fabric shutdown and startup 1314 initiated by production DBA 1312.

In an embodiment, a subset of queries are identified from the set of queries in the captured, existing schema/workload 1428 based on the resource constraints associated with data grid 200 and the produced dependency and volume information associated with the existing schema/workload 1428. Once identified, the queries are compiled into extreme OLTP schema/work-set 1326, which can be optimized at runtime.

IV. METHODS

A. Non-disruptive Partition Movement

In order to achieve the non-intrusive partition movement, applications must continue to have read write (RW) access to data being moved. For example, in scenarios where nodes 302 are performing under heavy OLTP load, partition movement is performed to be non-intrusive to connected applications. That is, grid applications and application servers 206 are allowed to have read write (RW) access to data during and do not experience lengthy delays during the movement. According to an embodiment, such partition movement is accomplished in a three-phase, process. Each phase of this process described below with reference to FIG. 15.

Figure 15:
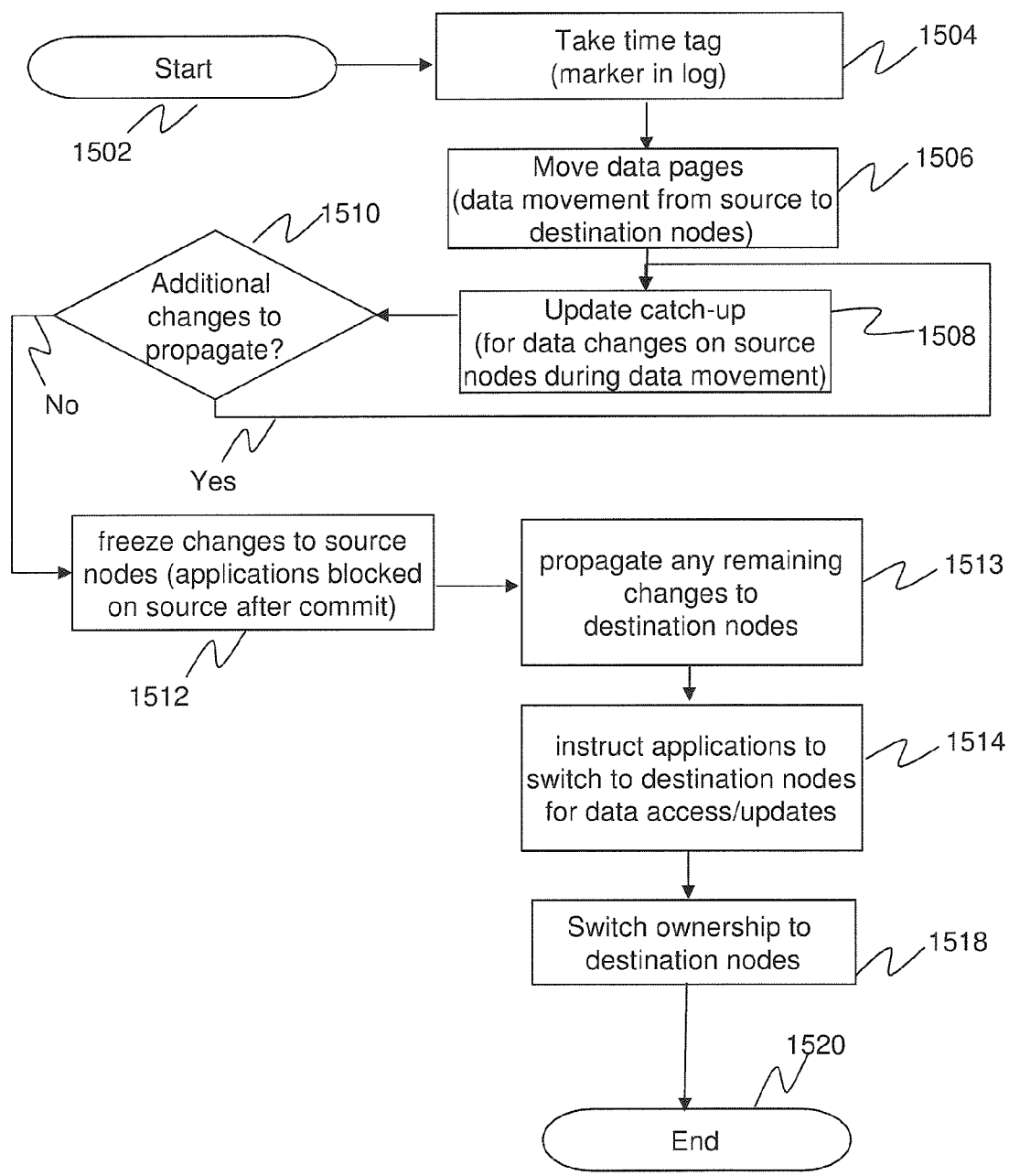
FIG. 15 is a flowchart of an exemplary method for non-disruptive data partition movement in a database environment, according to an embodiment.

FIG. 15 is a flowchart of an exemplary method 1500 for performing non-disruptive data partition movement for a data grid in a database environment, according to an embodiment. Method 1500 is described with continued reference to the embodiments illustrated in FIGS. 1-14. However, FIG. 15 is not limited to those embodiments. Although method 1500 is described as a phased process below, the steps in the flowchart do not necessarily have to occur in the order shown.

Method 1500 begins in step 1502, which includes capturing a status of transactions to determine which transactions have been completed and committed in a data grid (e.g., data grid 200 of FIG. 2A).

Method 1500 proceeds to step 1504, where phase 1 of the method, massive data movement begins.

1. Massive Data Movement

In step 1504, a time tag is taken. In an embodiment, this step involves taking a time tag as a marker in log records indicating the state of data within data grid 200 at a point in time. The time tag or marker is recorded so that the time that can be found later in method 1500. In an example embodiment, the time tag or marker can be saved in log storage 334. After the time tag is taken, the method proceeds to step 1506.

In step 1506, data pages are moved from source nodes to destination nodes. In this step, in order to ensure that the partition movement is non-disruptive, grid applications 206 are allowed to update data pages during the movement. Thus, while step 1506 is being performed, the data pages remains as RW pages on the source nodes while massive data movement to destination nodes is underway. In this embodiment, the source nodes remain the RW owners of the data, with the destination nodes to become the RW owners after method 1500 is complete. Once the data pages are moved, control is passed to step 1508, where the update catch-up phase begins.

2. Update Catch-Up

In step 1508, changes applied to data pages on source nodes during step 1506 are propagated to the destination nodes. Step 1508 is performed to propagate changes applied to data pages on source nodes that could not be propagated to the corresponding destination nodes while data pages were being moved. After the changes are propagated, control is passed to step 1510.

In step 1510, a determination is made as to whether there are additional changes to propagate. In an embodiment, there may be additional changes made to data on source nodes while step 1508 was being performed. Alternatively, step 1508 may not have been able to completely propagate all changes in cases where there were large amounts of catch-up changes (i.e., in extreme OLTP environments). If it is determined that there are additional changes to propagate to destination nodes, then control is passed back to step 1508, where the update catch up process is repeated. On the other hand, if it is determined in step 1510 that there are no more changes to propagate, then control is passed to step 1512. In one embodiment, steps 1508 and 1510 are repeated until there are no more changes to propagate. Once there are no more changes to propagate, the update catch-up phase ends and control is passed to step 1512.

Thus, by repeating steps 1508 and 1510, phase 2 propagates changes to data pages to reflect changes to data in pages moved during phase 1. These data changes are applied to destination nodes in multiple iterations as needed.

In an alternative embodiment, steps 1508 and 1510 are reiterated until there is a sufficiently small amount of remaining changes to propagate. According to an embodiment, this amount may be a pre-determined threshold set by a DBA. For example, this threshold can be a tunable parameter that can be changed by a DBA as step 1508 is being performed. Once the threshold is reached, control is passed to step 1512.

In yet another embodiment, if the difference or delta between the amount of remaining changes and the number of changes propagated in the previous iteration increases, is unchanged, or remains sufficiently small for multiple iterations of steps 1508 and 1510, applications causing data update activity on the source nodes can be 'throttled back' so that less data updates are allowed. This throttling back can be repeated for applications running against the source nodes as needed until a last set of catch-up changes is sent to the destination nodes in step 1508. Once this last set is sent and applied to the destination nodes, control is passed to step 1512.

3. Switch applications and Ownership to Destination Nodes

In step 1512, further changes to the source nodes are frozen so that no further changes are allowed to the data on the source nodes. In this step, grid applications 206 are blocked from applying any additional changes to the source nodes. After changes to source nodes are frozen, control is passed to step 1513. In an embodiment, grid applications 206 may be blocked at the transaction boundary (i.e., current transaction are allowed to complete, but new transactions are blocked).

In step 1513, any remaining changes are propagated to the destination nodes. In an embodiment, if there are any changes to propagate after new application transactions against the source nodes were blocked in step 1512, those transactions are executed on the destination nodes in step 1513. After any remaining changes are propagated, control is passed to step 1514.

In step 1514, grid applications 206 are instructed to switch to destination nodes for data access and updates. After this step completes, grid applications 206 are switched to the destination nodes, but the applications are still blocked (i.e., new transactions frozen) until the ownership is switched in step 1518. After the applications are switched to the destination nodes, control is passed to step 1518.

In step 1518, RW ownership of the data moved is switched from the source nodes to the destination nodes. After the RW ownership is switched, any future data changes resulting from grid application 206 transactions are applied to the destination nodes. After the ownership is switched, applications are resumed and control is passed to step 1520, where the method ends.

B. Non-Disruptive Cache Startup

Figure 16A:
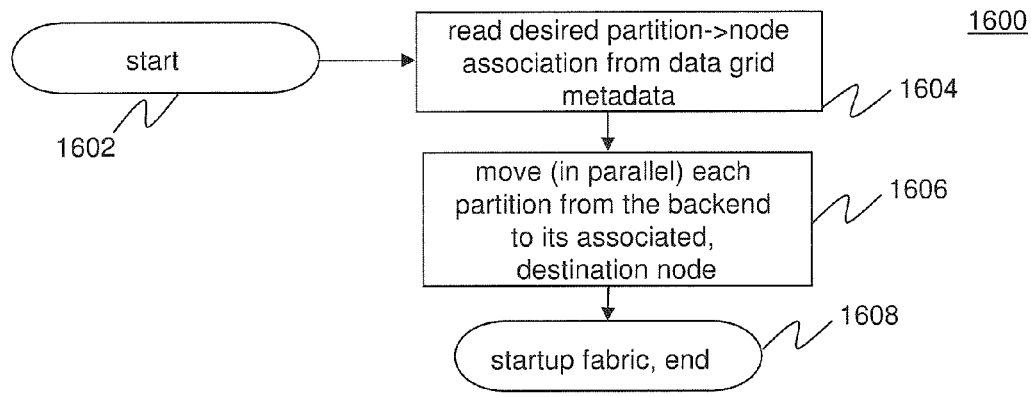
FIGS. 16A-16C are flowcharts of exemplary methods for non-disruptive cache startup, shutdown, and node rebalancing using data partition movement in a database environment, according to an embodiment.

FIG. 16A is a flowchart of an exemplary method 1600 for performing non-disruptive cache startup for a data grid in a database environment, according to an embodiment. Method 1600 is described with continued reference to the embodiments illustrated in FIGS. 1-15. However, FIG. 16A is not limited to those embodiments. Note that the steps in the flowchart do not necessarily have to occur in the order shown.

Method 1600 begins in step 1602. In an embodiment, when step 1602 begins, all partitions of the data fabric to be started resides on the grid backend 120. In an embodiment, with reference to FIG. 13, step 1602 may begin after a production DBA 1312 has selected a fabric startup 1314 operation. Control is then passed to step 1604.

In step 1604, partition-to-node association information for the cache to be started is read from data grid metadata. According to an embodiment, data grid 200 includes metadata that indicates which cache nodes 202 are associated with which partitions within a data fabric 220 to be started. After the partition to node association information is read, control is passed to step 1606.

In step 1606, using the information read in step 1604 each partition is moved to its associated cache node 202. In an embodiment, step 1606 is performed using method 1500 described above with reference to FIG. 15. According to an embodiment, this step is performed in a non-disruptive manner by copying data from grid backend 210 to nodes of a data fabric being started while allowing grid applications 206 to access the nodes. This step may be performed by using the partition movement method 1500 described with reference to FIG. 15 above. For example, the source during step 1608 is DRDB 312 on grid backend 210 and the destination nodes are IMDBs 330 within nodes 302 comprising a data fabric 220 to be started up. By employing partition movement method 1500 to perform step 1608, massive amounts of data from the DRDB 312 of grid backend 210 are used to populate nodes within a data fabric being started without preventing RW access to the data during the data movement required for startup.

In step 1608, after all data is on the appropriate node, the data fabric is started up and method 1600 ends.

C. Non-Disruptive Cache Shutdown

Figure 16B:
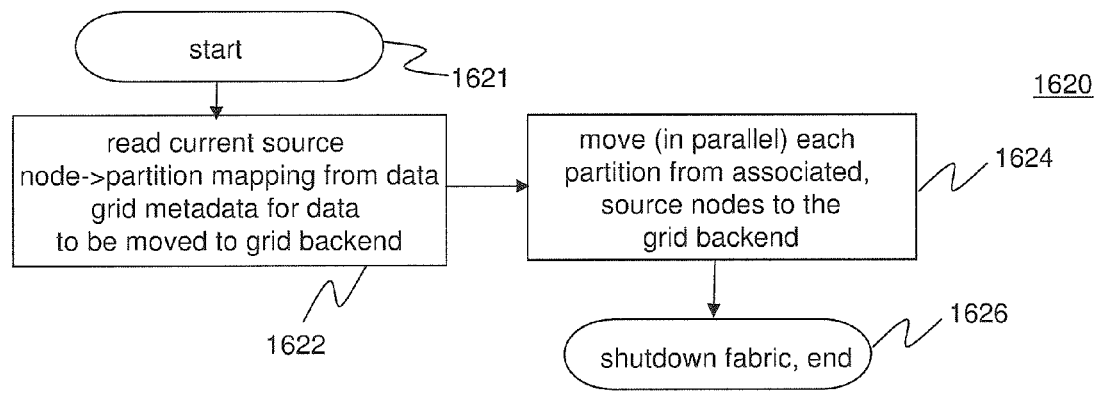

FIG. 16B is a flowchart of an exemplary method 1620 for performing non-disruptive cache shutdown for a data grid in a database environment, according to an embodiment. Method 1620 is described with continued reference to the embodiments illustrated in FIGS. 1-15. However, FIG. 16B is not limited to those embodiments. Note that the steps in the flowchart do not necessarily have to occur in the order shown.

Method 1620 begins in step 1621. In an embodiment, when step 1621 begins, each partition of the data fabric to be shut down belongs to some node within the data fabric. In an embodiment, with reference to FIG. 13, step 1621 may begin after a production DBA 1312 has selected a fabric shutdown 1314 operation. Control is then passed to step 1622.

In step 1622, partition-to-node association information for the cache to be shut down is read from data grid metadata. According to an embodiment, data grid 200 includes metadata indicating which cache nodes 202 are associated with which partitions within a data fabric 220 to be shut down. This information is used in step 1624 to determine data that needs to be moved from source nodes to the grid backend before the cache is shut down. After the partition to node association information is read, control is passed to step 1624.

In step 1624, as part of a non-disruptive cache shutdown, data is moved from the IMDBs of nodes comprising the data fabric being shutdown to grid backend 210. In this step, data is moved to DRDB 312 of grid backend 210 in order to facilitate a non-disruptive cache startup. Step 1626 may be performed by using the partition movement method 1500 described with reference to FIG. 15 above. For example, the source nodes during this step are in a plurality of IMDBs 330 on nodes 302 within a data fabric 220 being shutdown and the destination is a DRDB 312 on grid backend 210. By employing partition movement method 1500 to perform step 1624, massive amounts of data from the DRDB 312 of grid backend 210 are used to populate nodes within a data fabric being started without preventing RW access to the data during the data movement required for shutdown.

In step 1626, after all data is on the grid backend, the data fabric is shut down and method 1620 ends.

D. Node Rebalancing

Figure 16C:
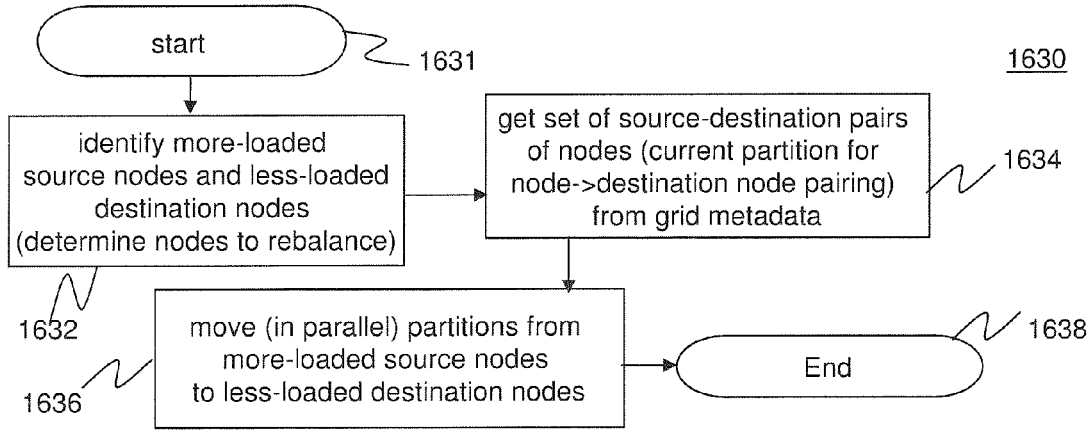

FIG. 16C is a flowchart of an exemplary method 1630 for performing non-disruptive cache node rebalancing for a data grid in a database environment, according to an embodiment. Method 1630 is described with continued reference to the embodiments illustrated in FIGS. 1-15. However, FIG. 16C is not limited to those embodiments. Note that the steps in the flowchart do not necessarily have to occur in the order shown.

Method 1630 begins in step 1631 and control is passed to step 1632. In an embodiment, when step 1631 begins, partitions of a data fabric with nodes to be rebalanced belong to one or more nodes within the data fabric.

In step 1632, 'more-loaded' and 'less-loaded' nodes within a data grid are identified. In an embodiment, this step comprises detecting relative overloading of nodes 302 within a data fabric 220 as compared to other nodes 302 in the data fabric 220. In accordance with an embodiment of the invention, more-loaded nodes are one or more nodes 302 within a data fabric 220 that have been or are currently carrying a relatively heavier processing load than other, less-loaded nodes 302 within the data fabric 220. In another embodiment, step 1632 identifies more-loaded and less-loaded nodes based upon their relative data storage loads. According to yet another embodiment, more-loaded and less-loaded nodes are determined based upon their relative combined processing and data loads.

In yet another embodiment, overloading can also be measured as an absolute value in that a node exceeding a certain, individual threshold (i.e., 80%) of resource utilization, such as, but not limited to central processing unit (CPU), memory, and data storage utilization, may be considered to be more-loaded even in cases where its resources are much greater than other, less-loaded nodes 302 within the data fabric 220. For example, cache nodes 202 with data storage utilization, measured as a percentage of available disk and/or memory storage, can be considered to be more-loaded when data storage utilization exceeds 80%.

After determining more-loaded and less-loaded nodes 302 of a data fabric 220 in step 1632, control is passed to step 1634.

In step 1634, partition-to-node association information for the cache to nodes to be re-balanced is read from data grid metadata. According to an embodiment, data grid 200 includes metadata indicating which cache nodes 202 are associated with which partitions within a data fabric 220 comprising nodes to be re-balanced. According to an embodiment, information describing the source and destination nodes for data to be moved as part of node rebalancing is placed in meta data with data grid 200. This information is read in step 1634 to determine data that needs to be moved from the more-loaded source node(s) to the less-loaded destination node(s) in order to rebalance data and/or processing loads amongst nodes comprising data fabric 220. After the partition to node association information is read, control is passed to step 1636.

In step 1636, data is moved from the more-loaded, source node(s) to the less-loaded, destination node(s) identified in step 1632. In this way, rebalancing method 1630 is achieved by rebalancing processing and/or data on a relative basis amongst nodes in a given data fabric. In an embodiment, in order to balance processing loads amongst nodes 302 of a data fabric 220—data slices 440 are moved between nodes 302 as described in section A with reference to FIG. 15 above. Using method 1500 in step 1636 allows for large amounts of data in data partitions to be moved from more-loaded nodes to less-loaded nodes in a non-disruptive manner. For example, by using method 1500 to complete step 1636, fabric data rebalancing can be readily achieved while allowing applications to continue to access the data. As part of such rebalancing, data slices 440 can be moved across nodes 302 of a partitioned data fabric 220 to spread the data or processing load more evenly between more-loaded and less-loaded nodes.

After the data is moved to the less-loaded destination nodes, control is passed to step 1638 where the process ends.

In an alternative embodiment, steps 1632-1636 may be repeated periodically in an iterative fashion so that node rebalancing method 1630 is a continuous process. In another embodiment, steps 1632-1636 may be repeated on an as-needed basis upon detecting that a node imbalance situation exits.

Embodiments of the invention and its components (grid applications and grid application servers 206, grid backend 210, nodes 302, IMDBs 330, and DRDB 312), or portions thereof, can be implemented in software, firmware, hardware, or a combination thereof. Embodiments of the invention and its component, or portions thereof, can also be implemented as computer-readable code executed on one or more computing devices capable of carrying out the functionality described herein. Examples of computing devices include, but are not limited to, a central processing unit, an application-specific integrated circuit, or other type of computing device having at least one processor and memory.

The use of a data grid as described herein is intended to provide improved performance and scalability through the interaction of several mechanisms. A key mechanism is a set of clustered cache nodes, linking clients to database servers in a data fabric configuration. As described above, database administrator can use methods 1500, 1600, 1620, and 1630 to move data partitions in order to perform non-disruptive cache startup, shutdown, and node rebalancing for a data fabric comprising cache nodes.

V. EXAMPLE COMPUTER SYSTEM IMPLEMENTATION

Aspects of the present invention shown in FIGS. 1-15 and 16A-16C, or any part(s) or function(s) thereof, may be implemented using hardware, software modules, firmware, tangible computer readable media having instructions stored thereon, or a combination thereof and may be implemented in one or more computer systems or other processing systems.

Figure 17:
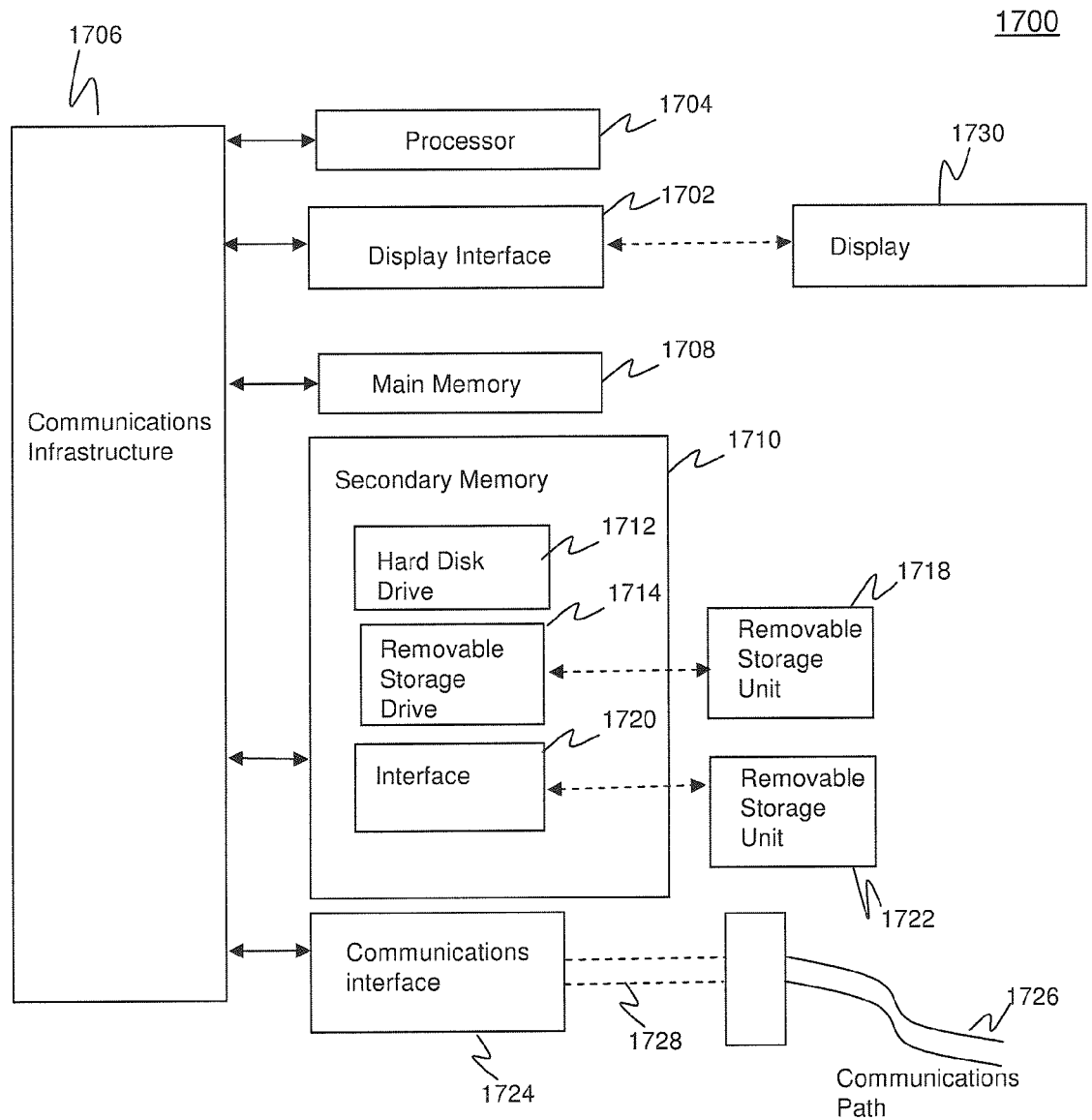
FIG. 17 is a diagram of an example computer system in which embodiments can be implemented.

FIG. 17 illustrates an example computer system 1700 in which embodiments of the present invention, or portions thereof, may be implemented as computer-readable code. For example, system 100 of FIG. 1 and data grid 200 of FIGS. 2A and 2B, can be implemented in computer system 1700 using hardware, software, firmware, non-transitory computer readable media having instructions stored thereon, or a combination thereof and may be implemented in one or more computer systems or other processing systems. Hardware, software, or any combination of such may embody any of the modules and components in FIGS. 1-15 and 16A-16C.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1704 may be a special purpose or a general purpose processor device. As will be appreciated by persons skilled in the relevant art, processor device 1704 may also be a single processor in a multi-core/multiprocessor system, such system operating alone, or in a cluster of computing devices operating in a cluster or server farm. Processor device 1704 is connected to a communication infrastructure 1706, for example, a bus, message queue, network, or multi-core message-passing scheme.

Computer system 1700 also includes a main memory 1708, for example, random access memory (RAM), and may also include a secondary memory 1710. Secondary memory 1710 may include, for example, a hard disk drive 1712, removable storage drive 1714. Removable storage drive 1714 may comprise a floppy disk drive, a magnetic tape drive, an optical disk drive, a flash memory, or the like. The removable storage drive 1714 reads from and/or writes to a removable storage unit 1718 in a well known manner. Removable storage unit 1718 may comprise a floppy disk, magnetic tape, optical disk, etc. which is read by and written to by removable storage drive 1714. As will be appreciated by persons skilled in the relevant art, removable storage unit 1718 includes a non-transitory computer usable storage medium having stored therein computer software and/or data.

In alternative implementations, secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communications interface 1724. Communications interface 1724 allows software and data to be transferred between computer system 1700 and external devices. Communications interface 1724 may include a modem, a network interface (such as an Ethernet card), a communications port, a PCMCIA slot and card, or the like. Software and data transferred via communications interface 1724 may be in the form of signals, which may be electronic, electromagnetic, optical, or other signals capable of being received by communications interface 1724. These signals may be provided to communications interface 1724 via a communications path 1726. Communications path 1726 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 1718, removable storage unit 1722, and a hard disk installed in hard disk drive 1712. Signals carried over communications path 1726 can also embody the logic described herein. Computer program medium and computer usable medium can also refer to memories, such as main memory 1708 and secondary memory 1710, which can be memory semiconductors (e.g. DRAMs, etc.). These computer program products are means for providing software to computer system 1700.

Computer programs (also called computer control logic) are stored in main memory 1708 and/or secondary memory 1710. Computer programs may also be received via communications interface 1724. Such computer programs, when executed, enable computer system 1700 to implement the present invention as discussed herein. In particular, the computer programs, when executed, enable processor device 1704 to implement the processes of the present invention, such as the stages in the methods illustrated by flowcharts 1500 of FIGS. 15 and 1600, 1620, and 1630 of FIGS. 16A-16C, discussed above. Accordingly, such computer programs represent controllers of the computer system 1700. Where the invention is implemented using software, the software may be stored in a computer program product and loaded into computer system 1700 using removable storage drive 1714, interface 1720, and hard disk drive 1712, or communications interface 1724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

VI. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   moving a data partition containing a data page, in response to a request for moving the data partition, from a source node to a destination node while simultaneously allowing an application read and write access to the data partition on the source node, wherein the source node retains ownership of the data partition;
   propagating data changes from the source node to the destination node, wherein the data changes were applied by the application to the data partition on the source node during the moving;
   iteratively propagating additional data changes from the source node to the destination node until a number of remaining additional data changes is below a threshold value, wherein the additional data changes were applied by the application to the data partition on the source node during a previous propagation;
   limiting the read and write access of the application to the source node containing the data partition at the conclusion of the iterative propagation;
   instructing the application to perform future read and write operations on the destination node;
   switching ownership of the data partition to the destination node; and
   resuming the read and write access of the application to the data partition.

2. The method of claim 1, wherein the limiting further comprises:
   allowing current application transactions against the source node to complete;
   committing the allowed transactions on the source node;
   blocking new application transactions targeting the source node; and
   propagating data changes resulting from the committed transactions to the destination node.

3. The method of claim 1, further comprising:
   taking a time tag before the moving by creating a marker in log records of a plurality of in-memory database (IMDB) system nodes in a data grid indicating the state of data at a point in time, wherein the data changes applied by the application during the moving were applied after a time indicated by the time tag; and
   recording the marker.

4. The method of claim 1, wherein the threshold value is based on a resource utilization of the source node.

5. The method of claim 4, further comprising:
   upon determining that an amount of additional data changes to the data partition to be propagated is greater than the threshold value, performing another iteration of propagation.

6. The method of claim 4, wherein the threshold value is a tunable value.

7. The method of claim 6, wherein the tunable value is a number of data manipulation language (DML) statements to be executed on the destination node.

8. The method of claim 1, further comprising:
determining if a current amount of additional changes to the data partition to be propagated is greater than or equal to a prior amount of additional changes in the previous propagation iteration;
upon determining that the current amount is less than the prior amount, performing another iteration of propagation; and
upon determining that the current amount is greater than or equal to the prior amount:
limiting the read and write access by throttling the access by the application to the source node, and
performing another iteration of propagation.

9. The method of claim 1, wherein the propagating and iteratively propagating are initiated as part of the response to the request for moving the data partition.

10. A non-transitory computer readable storage medium having instructions stored thereon that, in response to execution by a computing device, cause the computing device to perform operations for performing a non-disruptive cache shut down in a database environment, the operations comprising:
receiving a command to shut down a data fabric within a data grid in the database environment;
creating a time tag indicating the state of data at a point in time within an in-memory database (IMDB) system nodes;
moving a data partition containing a data page associated with the time tag, in response to the receiving, from the IMDB system node to a disk resident database (DRDB), while simultaneously allowing an application read and write access to the data partition on the IMDB system nodes, wherein the IMDB system node retains ownership of the data partition;
propagating data changes from the IMDB system node to the DRDB, wherein the data changes were applied by the application to the data partition on the IMDB system node during the moving;
iteratively propagating additional data changes from the IMDB system node to the DRDB until a sufficiently small number of additional data changes remain, wherein the additional data changes were applied by the application to the data partition on the IMDB system node during a previous propagation iteration, and wherein the sufficiently small number is based on a threshold value;
upon finishing the iterative propagation, limiting the read and write access of the application to the source node containing the data partition; and
shutting down the data fabric.

11. A computer program product comprising a non-transitory computer readable storage medium having computer program logic stored thereon that, in response to execution by a processor, causes the processor to perform a non-disruptive cache startup in a database environment by performing operations comprising:
receiving a command to start up a data fabric within a data grid in the database environment;
reading metadata within the data grid indicating a data partition associated with an IMDB system node;
moving the data partition containing a data page from a disk resident database (DRDB) to the IMDB system node, in response to the receiving, while simultaneously allowing an application read and write access to the data partition on the DRDB, wherein the DRDB retains ownership of the data partition;
propagating data changes from the DRDB to the IMDB system node, wherein the data changes were applied by the application to the data partition on the DRDB during the moving;
iteratively propagating additional data changes from the source node to the destination node until a number of remaining additional data changes is below a threshold value, wherein the additional data changes were applied by the application to the data partition on the source node during a previous propagation;
limiting the read and write access of the application to the DRDB containing the data partition on the conclusion of the iterative propagation;
instructing the application to perform future read and write operations on the IMDB system node;
switching ownership of the data page to IMDB system node; and
resuming the read and write access of the application to the data page.

12. The computer program product of claim 11, the operations further comprising, prior to the reading:
retrieving a time tag indicating the state of data at a point in time within a plurality of in-memory database (IMDB) system nodes organized as the data fabric, wherein the reading is based on the time tag.

13. The computer program product of claim 12, wherein the point in time is the time of a prior data fabric shutdown.

14. The computer program product of claim 11, wherein the propagating and iteratively propagating are initiated as part of the receipt of the command to start up the data fabric.

15. A system, comprising:
a data fabric comprising a first in-memory database (IMDB) system node and a second IMDB system node, the first IMDB system node and the second IMDB system node organized to store data according to a data granularity type;
a load determining module configured to determine a first load value for the first IMDB system node and a second load value for the second IMDB system node, wherein the load determining module is further configured to identify, based on the first and second load values, a more-loaded IMDB system node and a less-loaded IMDB system node;
a rebalancing module configured to, in response to a request to rebalance IMDB system nodes of the data fabric, move a data partition containing a data page from the more-loaded IMDB system node of the first IMDB system node and the second IMDB system node to the less-loaded IMDB system node to better distribute a data or processing load within the data fabric and retain data partition ownership with the more-loaded IMDB system node, wherein the rebalancing module is further configured to simultaneously allow an application read and write access to the data partition on the more loaded IMDB system node during the moving;
an update catch-up module configured to:
propagate data changes from the more-loaded IMDB system node to the less-loaded IMDB system node, wherein the data changes were applied by the application to the data partition on the more-loaded IMDB system node during the moving, and
iteratively propagate additional data changes from the source node to the destination node until a number of remaining additional data changes is below a threshold value, wherein the additional data changes were applied by the application to the data partition on the source node during a previous propagation; and a switching module configured to:
  limit the read and write access of the application to the more-loaded IMDB system node containing the data partition at the conclusion of the iterative propagation
  instruct the applications to perform future read and write operations on the less-loaded IMDB system node;
  switch ownership of the data partition to the less-loaded IMDB system node; and
  resuming the read and write access of the application to the data partition.

16. The system of claim 15, wherein the first load value is determined as a relative load in relation to other IMDB system nodes in the data fabric.

17. The system of claim 15, wherein the first load value is determined as a relative processing load as compared to other IMDB system nodes in the data fabric.

18. The system of claim 15, wherein the first load value is determined as a relative data load as compared to other IMDB system nodes in the data fabric.

19. The system of claim 15, wherein the first load value is determined based on an absolute processing load on the first IMDB system node.

20. The system of claim 19, wherein the absolute processing load is measured as a percentage of central processing unit (CPU) capacity available on the first IMDB system node.

21. The system of claim 15, wherein the first load value is determined based on an absolute data storage load measured as a percentage of data storage capacity available on the first IMDB system node.

22. The system of claim 15, wherein the propagating and iteratively propagating are initiated as part of the response to the request to rebalance IMDB system nodes of the data fabric.

* * * * *